United States Patent
Dao et al.

(10) Patent No.: US 11,444,850 B2
(45) Date of Patent: Sep. 13, 2022

(54) METHOD AND APPARATUS FOR COMMUNICATION NETWORK QUALITY OF SERVICE CAPABILITY EXPOSURE

(71) Applicants: Ngoc Dung Dao, Ottawa (CA); Xu Li, Nepean (CA)

(72) Inventors: Ngoc Dung Dao, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/582,623

(22) Filed: Apr. 29, 2017

(65) Prior Publication Data

US 2017/0317894 A1    Nov. 2, 2017

Related U.S. Application Data

(60) Provisional application No. 62/330,743, filed on May 2, 2016.

(51) Int. Cl.
| | |
|---|---|
| *H04L 41/5009* | (2022.01) |
| *H04W 28/24* | (2009.01) |
| *H04L 41/5025* | (2022.01) |
| *H04L 41/50* | (2022.01) |

(52) U.S. Cl.
CPC ...... *H04L 41/5012* (2013.01); *H04L 41/5009* (2013.01); *H04W 28/24* (2013.01); *H04L 41/509* (2013.01); *H04L 41/5025* (2013.01); *H04L 41/5087* (2013.01)

(58) Field of Classification Search
CPC ......... H04L 29/06; H04L 67/02; H04L 41/28; H04L 67/06; H04L 67/04; H04L 69/329; H04W 4/18; H04W 8/183; H04W 80/00; H04W 80/12
See application file for complete search history.

(56) References Cited

U.S. PATENT DOCUMENTS

| | | | | |
|---|---|---|---|---|
| 7,068,632 | B1 * | 6/2006 | Ho ........................ | H04W 28/26 370/338 |
| 9,998,379 | B2 * | 6/2018 | Nanda ............... | H04W 28/0205 |
| 2002/0191543 | A1 * | 12/2002 | Buskirk .................. | H04L 47/29 370/230.1 |
| 2008/0310324 | A1 | 12/2008 | Chaponniere | |
| 2011/0202641 | A1 | 8/2011 | Kahn et al. | |
| 2014/0160990 | A1 | 6/2014 | Sachdev et al. | |
| 2014/0169192 | A1 * | 6/2014 | Zhang .................. | H04W 24/08 370/252 |
| 2015/0103670 | A1 | 4/2015 | Wu et al. | |
| 2015/0304939 | A1 | 10/2015 | Liu et al. | |

(Continued)

FOREIGN PATENT DOCUMENTS

| | | |
|---|---|---|
| CN | 101682582 A | 3/2010 |
| CN | 103392353 A | 11/2013 |

(Continued)

OTHER PUBLICATIONS

3GPP TS 23.501 V0.4.0, System Architecture for the 5G System; Stage 2 (Release 15) (Year: 2017).*

(Continued)

*Primary Examiner* — Oussama Roudani

(57) ABSTRACT

A method and system for providing access to Quality of Service levels from within a network to entities outside of the network.

14 Claims, 26 Drawing Sheets

(56) References Cited

U.S. PATENT DOCUMENTS

| | | | | |
|---|---|---|---|---|
| 2017/0019816 | A1* | 1/2017 | Yuan | H04W 28/24 |
| 2017/0244614 | A1* | 8/2017 | Wu | H04L 41/0631 |
| 2017/0265063 | A1* | 9/2017 | Xie | H04L 29/08 |
| 2017/0289046 | A1* | 10/2017 | Faccin | H04L 47/2433 |
| 2018/0270888 | A1* | 9/2018 | Faccin | H04W 36/22 |
| 2019/0075606 | A1* | 3/2019 | Myhre | H04L 45/64 |
| 2019/0141081 | A1* | 5/2019 | Kunz | H04W 12/06 |
| 2019/0254016 | A1* | 8/2019 | Lu | H04W 72/0406 |

FOREIGN PATENT DOCUMENTS

| | | |
|---|---|---|
| CN | 103621023 A | 3/2014 |
| WO | 2009065360 A1 | 5/2009 |

OTHER PUBLICATIONS

International Search Report dated Jun. 15, 2017 for corresponding International Application No. PCT/CN2017/082701 filed May 2, 2017.
3GPP TR 23.799 V0.4.0 "Study on Architecture for Next Generation System", Apr. 2016.
3GPP TR 23.799 V2.0.0 "Study on Architecture for Next Generation System", Nov. 2016.

* cited by examiner

METHOD AND APPARATUS FOR COMMUNICATION NETWORK QUALITY OF SERVICE CAPABILITY EXPOSURE

CROSS-REFERENCE TO RELATED APPLICATIONS

This application claims the benefit of priority to U.S. Provisional Patent Application No. 62/330,743 filed May 2, 2016, the contents of which are incorporated herein by reference in their entirety.

FIELD OF THE INVENTION

The present invention pertains to the field of communication networks and in particular to a system and method for enabling a communication network to provide its quality of service capabilities to entities outside of the network.

BACKGROUND

In Fourth Generation (4G) mobile networks, such as those based on Long-Term Evolution (LTE) standards specified by the Third Generation Partnership Project (3GPP), numerous functions, such as fee charging and Quality of Service (QoS) guarantees, are provided by network functions in the core network, also referred to as the Evolved Packet Core (EPC). In Third Generation (3G) networks, these functions were provided by entities in the Packet Core (PC).

4G network architectures allow for a limited number of QoS levels. Conventional approaches to Customer Service Management (CSM) have typically been offered on a per-device basis. However, as technologies and wireless network capabilities have evolved, new services and service levels are possible, but not available due to the limitations of conventional service offerings, CSM, and charging. In order to improve the Quality of Experience (QoE) for users of the networks, a new approach is needed to enable the new technologies and wireless network capabilities to allow for the new services and service levels.

This background information is provided to reveal information believed by the applicant to be of possible relevance to the present invention. No admission is necessarily intended, nor should be construed, that any of the preceding information constitutes prior art against the present invention.

SUMMARY

In accordance with a first aspect of the present invention, there is provided a method of communicating network capability information. The method comprises receiving, from an application server, a network capability request comprising a quality of service (QoS) capability request; obtaining network capability information; and sending, to the application server, an indication of the network capabilities determined in accordance with the obtained network capability information.

In an embodiment of the first aspect of the present invention, obtaining network capability information comprises sending a message in accordance with the received network capability request to one of a policy control function (PCF) and a session management function (SMF); and receiving the network capability information from the one of the PCF and the SMF. In another embodiment, obtaining network capability information comprises obtaining the network capability request from a data repository. In another embodiment, the method further comprises receiving notification of a transport protocol and protocol parameters selected by the application server for the data flow of the at least one network service. In another embodiment, the network capability information comprises at least one of: an assigned QoS parameter associated with a data flow between the application server and a user equipment (UE); a UE mobility context of the UE; and a QoS label for data flow of the network service. In a further embodiment, the at least one QoS parameter comprise at least one of: a mean data rate; a minimum data rate; a maximum data rate; an effective data rate; a packet delay limit; and a packet loss rate. In another embodiment, the QoS label comprises a priority level label attachable to packets of data flows between the application server and the UE. In a further embodiment, the method includes transmitting an instruction to associate associating a packet handing procedure to the QoS label towards a node in the network. In another embodiment, the method comprises receiving a change notification from a node in one of the Radio Access Network and the User Plane, the change notification comprising at least one of a network condition change; and a UE context change. In a further embodiment, the method comprises sending updated network capability information based on the received change notification to the application server. In a further embodiment, the method comprises receiving, subsequent to sending the updated network capability information, notification of an updated protocol parameter associated with the data flow from by the application server. In another embodiment, the method further comprises transmitting an updating packet handling procedure associations for the QoS label, the updated procedure based on the received notification of the updated transport protocol.

In a second aspect of the present invention, there is provided a network element function. The network element function comprises a n application server interface and a QoS monitor. The application server interface enables communication with an application server. The QoS monitor and control function is configured to receive a network capability request from the application server through the application server interface, the network capability request comprising a QoS capability request; obtain network capability information; and send the obtained network capability information to the application server through the application server interface.

In an embodiment of the second aspect of the present invention, the network element function is one of a network exposure function and a policy control function. In another embodiment, the network element function further comprises a user equipment (UE) interface for communicating with a UE; and a quality of experience (QoE) monitor for engaging with at least one interface to evaluate the services received by at least one of the application server and the UE. In a further embodiment, the QoE monitor is a network data analytics (NWDA) element. In another embodiment, the function further comprises a core network gateway (CN-GW) interface for communicating with a CN-GW; an access network gateway (AN-GW) interface for communicating with an AN-GW; and a radio node interface for communicating with a radio node. In another embodiment, the QoS monitor and control function are instantiated at a server hosting a policy control function (PCF). In a further embodiment, the network capabilities information comprises at least one of: at least one assigned QoS parameter for at least one data flow of at least one network service between the application server and a user equipment (UE); a UE mobility context of the UE; and at least one QoS label for individual data flows of the at least one data flow of the at least one network service.

In accordance with a third aspect of the present invention, there is provided a network function for providing network capability information to an application server external to a network. The network function comprises a network interface for communicating with the application server and functions within the network; a processor; and a memory for storing instructions that when executed by the processor cause the network function to be configured to carry out the method described in the first aspect and its accompanying embodiments.

Those skilled in the art will appreciate that the embodiments described above with respect to the various aspects of the invention, can be applied alone or in combination with other embodiments to the aspect with respect to which they are described, as well as to the other aspects. Embodiments that are mutually exclusive and that thus cannot be combined will be clearly apparent to those skilled in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
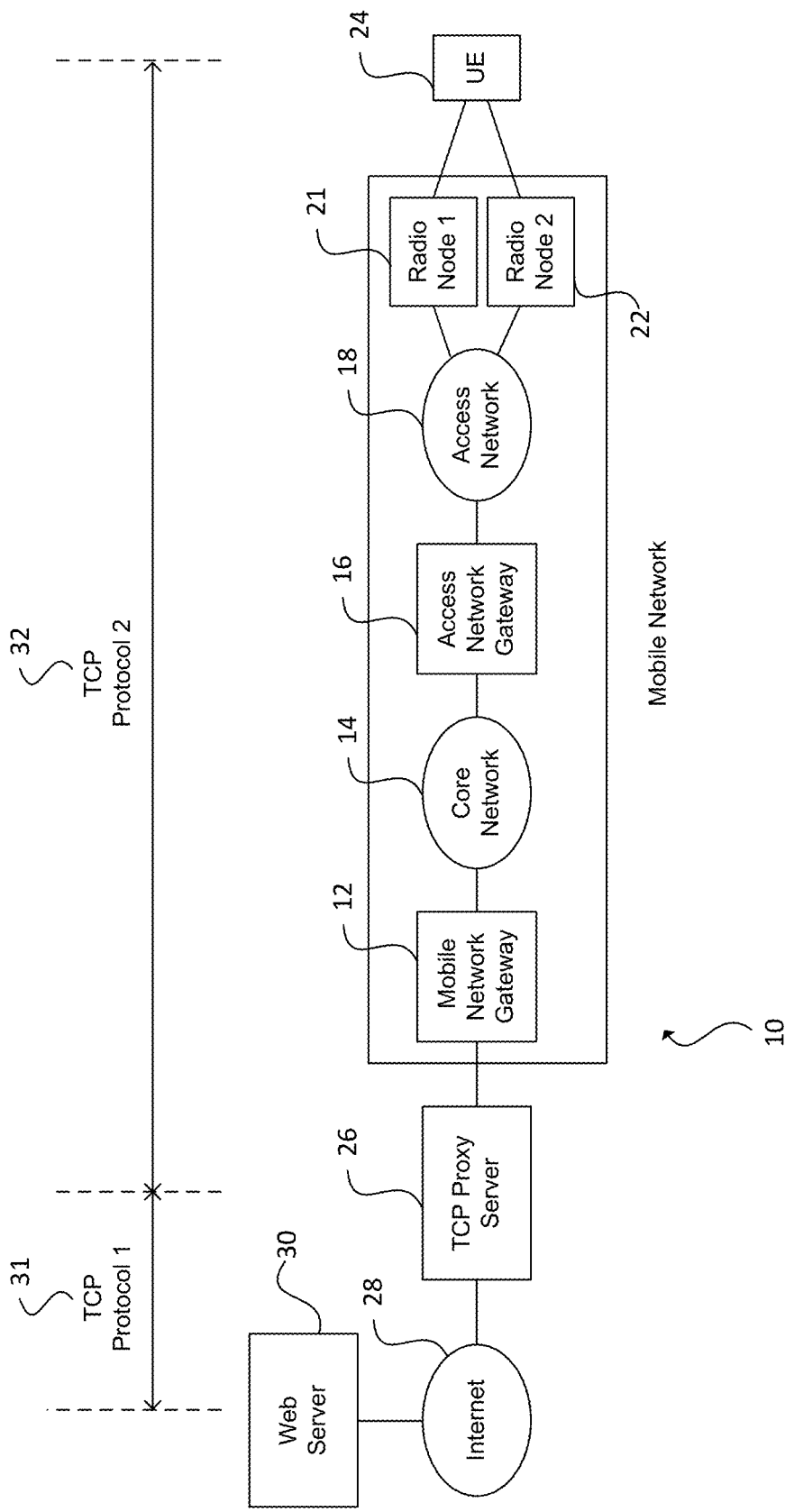
FIG. 1 illustrates a prior art communication network.

In accordance with some embodiments of the present invention, there is provided a system and method for providing a mechanism for a communication network to expose its quality of service capabilities to entities outside of the communication network.

In some embodiments of the present invention, there is a provided a system and method for a communication network to be able to provide a measure of its QoS capabilities, or access to the ability to configure QoS/QoE through the network towards a UE, to entities outside of the communication network.

Various acronyms as used herein are defined in the following non-exhaustive list:

AMF: Access and Mobility Management Function
AN: Access Network
CN: Core Network CP: Control Plane
GW: Gateway
MM: Mobility Management
MNO: Mobile Network Operator
NS: Network Slice
PCF: Policy Control Function
QoE: Quality of Experience
QoS: Quality of Service
QCI: QoS Control Indicator
QFI: QoS Flow Identity
SM: session management
SMF: Session Management Function
SPC: subscription and policy control
TCP: Transmission Control Protocol
UDP: User Datagram Protocol
UE: User Equipment
UP: User Plane As used herein, a "network" or "communication network" may service various devices including but not necessarily limited to wireless devices. Such a network may include a radio access portion and a backhaul portion. The network may further comprise various virtualized components as will become readily apparent herein. A primary forward looking example of such a network is a so-called Fifth Generation (5G) network. It has been proposed that 5G networks be built with various network technologies that allow for the network to be reconfigured to suit various different needs. These technologies can also allow the network to support network slicing, as described below, to create isolated sub-networks with characteristics suited for the needs of the traffic that they are designed to support. The network may include a number of computing hardware resources that provide processors, memory, and storage to functions executing on the network, as well as a variety of different network connectivity options connecting the computing resources to each other, and making it possible to provide service to electronic devices such as mobile devices. A mobile device need not be mobile itself, but instead it is a device that can be connected to the network using connections that are aimed at providing mobility. One example of a mobile device is the User Equipment (UE) as defined by the 3GPP, which may include both handsets through which users communicate with network entities as well as Machine-to-Machine (m2m) devices (also referred to as Machine Type Communications (MTC) devices). Those skilled in the art will appreciate that the use of the term Electronic Device is intended to broadly cover UEs, other types of devices that connect to the mobile network whether they do or do not fall under the definition of the term UE, as well as infrastructure elements such as base stations as well as network functions.

Network slicing refers to a technique for creating different subnetworks that allow for the separation of different types of network traffic. Slicing can be used in reconfigurable network architectures, such as networks employing Network Function Virtualization (NFV). A network slice (as defined in 3GPP TR 22.891 entitled "Study on New Services and Markets Technology Enablers") is a collection of logical network functions that supports the communication service requirements of a particular network service. One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator In 3G/4G networks, there are a small number of different QoS levels that are statically defined, typically at a time of device subscription. A UE accessing a given service is assigned a QoS level. The QoS level associated with the UE is typically defined in subscriber information stored in the network. In order to change the QoS level, the user must request a change to their subscription for that that UE. Furthermore, control of the QoS level relates solely to the amount of bandwidth that may be allocated in the network. In order to meet the defined QoS level, the network operator can only make gross adjustments to the network in an effort to increase the network throughput, such as by using traffic shaping. Different network loading conditions are not typically considered in the QoS guarantee on a session by session basis.

Accordingly, the QoE experienced by a user on a particular UE may differ between services that they access, and depending upon where they are geographically located. If the user is out of the service area of their home network they roam on another network. The service provided to the UE on a roaming network is typically defined by an agreement between the two MNO's, and there is very little expectation that the roaming network operator will respect the QoS, or QoE, guarantees, but with little to no expectation of meeting a particular QoS or QoE while roaming.

In the designs for the core networks proposed for 5G mobile networks, various new types of services may be provided and more extensive and deeper collaboration among multiple operators may be necessary. In order to achieve an the QoE that an operator commits to a user, the QoS for each "service" accessed by the user's UE should be differentiated and communicated to all networks and devices that carry that service. Current 3G and 4G networks do not provide mechanisms for communicating QoS information outside of the network. Current legacy networks cannot "expose" QoS information to other entities.

Referring to FIG. 1, a legacy mobile network 10 using an Application Server such as, such as TCP proxy is presented. Other examples of Application Server can be IMS (IP Multimedia Subsystem) that provides voice and video communications, or Mobile Edge Computing (MEC) system, or Multimedia Priority Service (MPS) system. In the figure, a UE 24 may access the mobile network 10 through either radio node 1 21 or radio node 2 22. Radio node 1 21 and radio node 2 22 providing connectivity to the access network 18, and through the access network gateway 16 the core network 14. The boundary of the mobile network 10 (sometimes referred to as a network border) is maintained by the mobile network gateway 12. The mobile network gateway 12 connects to the Internet 28 through an Application Server, such as TCP proxy server 26 to gain access to a web server 30. When using TCP, the web server 30 is connected to the TCP proxy server 26 under a first TCP protocol 31, and the UE 24 connects to the TCP proxy server 26 under a second TCP protocol 32. In each segment there is one specific TCP variant.

Due to its proximity to the access network 18 and the UE 24, the TCP proxy server 26 is able to provide a coarse reaction to changing network conditions, to assist with maintaining the connection. The TCP proxy server 26, however, lacks MNO information about current network capability. A conventional TCP proxy server 26 is also unable to accommodate a UE 24 that has multiple connections to the access network 18. I.e., the TCP proxy server lacks information regarding the UE's multiple connections to multiple Access Networks where each connection has different QoS provisioning in terms of transmission delay, data rate, jitter, etc. If a UE 24 has multiple connections, (e.g. the UE 24 connects to more than one Radio Node, resulting in multiple paths through which the UE 24 can connect to the network), the comparative QoS parameters, such as data rate and packet delay, on each connection may differ. This problem may be accentuated if one or more of the connections is made using a different radio access technology (RAT) (e.g. a first connection may be made using a first radio access technology, such as an LTE connection, while a second connection may be made using a second radio access technology, such as an as of yet undefined radio access network protocol, or a non-mobile network technology such as WiFi™). In these cases, the TCP proxy server 26 may have difficulty adjusting the TCP parameters, such as retransmission timer or identifying which packets were actually lost, rather than merely delayed. Furthermore, there is no current mechanism for UE and TCP proxy servers to report QoE feedback parameters experienced by the UE to the mobile network operator.

Next generation networks propose enhanced connectivity for a mobile device, such as UE 24, and the ability for a UE 24 to simultaneously maintain multiple radio connections to multiple radio nodes 21, 22. Furthermore, the UE 24 will have the ability to access the network through a plurality of different RATs at the same time, taking advantage of overlapping coverage between legacy network and next generation network. In some cases, a UE 24 may even rely upon another UE to act as a relay to gain connectivity. This flexibility in radio connectivity leads to a number of problems for the above described legacy architecture. For instance, individual connections may have different link lengths (physically and/or logically) which may lead to comparative packet delay between connections. Multiple connections across multiple RATs would support very different QoS characteristics, including further increase the comparative packet delay between connections and different data rates. It should be understood that the use of multiple connections across multiple RATs may, in some embodiments, serve to enable support of the differing QoS characteristics. These characteristics may include a packet delay that may vary across the different connection types. In some embodiments, the differences in QoS characteristics such as packet delay may be provided as a differential or comparative value (the same is true for data rates). These rates may be established as increases upon a base rate defined by a particular connection type.

A TCP proxy server 26 would have difficulty managing multiple connections as its control is based upon measurement of packet delay, without vision of the downstream network conditions within the mobile network 10. It will be understood that reference to managing may include the adjusting of operational parameters for the multiple connections. Complicated connection architectures are more likely to result in comparative packet delay, which would cause a timeout duration in the TCP proxy server 26 to be tripped. From its perspective, the TCP proxy server 26 would have difficulty in determining which packets were actually lost, versus which packets are delayed.

Two options for remedying this condition without redesigning the network would be to either increase the default timeout period, or to react to delayed packets as lost packets and send additional packets requesting re-transmission. Each approach has its own drawbacks. Increasing the default timeout period would increase the time to react when packets were actually lost, slowing the reaction time of the TCP proxy server 26. Reacting to delayed packets as lost packets results in unnecessary communications and re-transmissions which can cause unnecessary network congestion.

To address deficiencies in existing systems, below there is proposed a system and method for enabling complex connection architectures by opening a window into the mobile network 10 and providing QoS information to expose the network QoS capability to entities outside of the network 10. Because the entities outside the network 10 have access to the QoS information, connection management decisions may be made independent of packet delay, or based upon a combination of QoS information and packet delay. In some embodiments, the packet delay information may be included within the QoS information.

A system and method for enabling QoE reports for on-going flows (such as data flows) and services, sent from either the UE or an application server (e.g. of a MNO or a third party external to the network) to a control function of the mobile network is also disclosed. It should be understood that the method and system may also be used for flows that are no long on-going, for example as part of a data analytics process A system and method for a UE and an application server to inform a MNO of the mapping functions between discrete QoE parameter reports and long-term QoE levels perceived by end users is also disclosed.

5G systems may support a number of diversified real-time applications including critical eHealth/mHealth, HD/4K/8K/3D video conferencing, virtual-reality applications, gaming, mission critical communications, along with the delivery of non-real time data streams such as Internet Protocol Television (IPTV). Real-time video services require a low end-to-end packet delay budget, e.g., 150 ms. However, if a limited number of video packets do not get delivered, it may be possible for the packet loss to be compensated for by employing video concealment techniques at the video decoders. In current third and fourth generation (3G/4G) networks compliant with 3GPP standards, the QCI for real-time video allows $10^{-3}$ packet loss rate. In practice, the error tolerance of different video codecs can be significantly varied, depending on video display resolution, robustness of video decoder, and the nature of video (e.g., fast or slow scene changes), among other factors. Therefore, the acceptable packet loss rate could be different for different video codecs and display resolutions. Furthermore, video applications may have quality of experience (QoE) requirements in addition to, or in place of the QoS requirements on a traffic flow. The user perceived QoE is a function of QoS parameters. Because the QoS requirements define a level of service in a network connection, the QoS parameters alone may not give a direct indication of actual user perceived QoE. For example, a video stream that is interrupted by five delays spread through the duration of the stream, with each delay being a single second, may result in a user experience that is worse than a single 5s delay at the start of the video. The QoS for such a connection may be the same. Additionally, the QoE will be a function not only of the QoS, but also of the video parameters. A video that experiences a number of delays may be a worse experience for a viewer than a smooth experience with a different resolution, or a different codec. Therefore, 3GPP video PSS and 3GP-DASH services support QoE reports so that the actual QoE level can be derived reliably. Currently, there is no mechanism provided to support QoE report for OTT services.

In order to meet the QoE requirements of video services, the network may include a common framework allowing OTT services carried by the MNO to participate in the reporting of QoE measurements in real time. The QoE reports can be sent from any of: a UE, from an application server of MNO and from an application server of a third party. These QoE reports may be transmitted to a CP function. The CP function that receives a QoE report can process QoE report messages, provide a mapping between aggregated QoE reports and the required QoS parameter configuration.

The QoE reports may be customized for different traffic types, including real-time and none-real-time video services. The QoE reports can include information that allows for identification of different traffic flows or different services (e.g., IP 5-tupple information, user subscriber number, Temporary Mobile Subscriber Identity (TMSI), and application status (e.g., playout buffer size, service interruption time, and whether the application is background).

The Guaranteed Bit Rate (GBR) and Maximum Bit Rate (MBR) QoS parameters may be used for radio resource management (RRM) and admission control for real-time video services. In video coding, the intra coded video frames (referred to as I-frames in MPEG encoding) are generated periodically. The I-frames are used to refresh video coding quality as well as to provide random access to recorded video files during play back. The size of I-frames is usually much larger than the other video dependent frames (e.g., predictive frames or P-frames). When being transmitted in real time and due to the packet delay constraint, the instantaneous peak bit rate of I-frames can be several times higher than the averaged bit rate of video flows. If some packets of an I-frame are lost, video decoders may be unable to decode this I-frame and other dependent P-frames, which may result in a video stall of one or several seconds. Alternatively, without being able to decode an I-frame of an in progress video stream may continue rendering using the "difference" information in a P-frame. However, complex changes (e.g. a scene change in a program) may result in very poor decoding quality. Therefore, the MBR may be set several times higher than the GBR as recommended. Consequently, the system resources are largely reserved to handle the MBR of real-time video flows.

In the RAN, there are two typical scenarios that could trigger optimization of radio resources: determination that a particular cell or access node is overloaded and a determination that a particular cell or access node under loaded. In the overloaded scenario, the RRM is triggered to optimize the use or allocation of radio resources, such as transmit power and antennas. The RRM may also add more spectrum to overloaded cells. The usage of radio resources of neighbour cells surrounding overloaded cells may also be adjusted. In the under loaded scenario: network resources such as spectrum, transmit power, and allocated antennas can be reduced. The reduction in any or all of spectrum allocation, allocated antennas and transmit power may result in an energy savings. Any or all of these reductions may also reduce interference to other cells. These reductions may aid in minimizing energy consumption in the operation of the overall network.

For admission control and RRM optimization, using the average bit rate (ABR) as an input to the admission control process may lead to a poor QoE because the high max rate of video flows may not be satisfied if congestion happens. With this realization, some designs may try to use a max rate as an input parameter so that adequate resources are reserved to handle the high peak rates of real-time video flows. Unfortunately, this reservation can lead to a waste of resources if the reserved resources are not used by other flows. Thus, neither the ABR nor MBR may be an efficient value to use in representing real-time video requirements. Another bit rate within the range of ABR and MBR should be used to make admission control decision and RRM for real-time video services; e.g., the "effective bit rate".

An "effective bite rate" (EBR) may be added as a QoS parameter to provide "optimal service level quality as per application needs" and to "minimize energy consumption in the overall network operation" for real-time video flows. The EBR can be defined as a data rate that the system should be provisioned (and in some cases dynamically provisioned) to maintain an acceptable QoE level for end user applications.

During real-time video sessions, the required EBR may be dynamically estimated by monitoring the QoE feedback parameters. The CP functions of the Core Network can estimate the effective rate. The EBR can be adjusted to achieve a QoE target level defined by mobile network operators. For example, if the long-term QoE level of a user application is above a threshold, the EBR can be reduced to improve the resource utilization. If the QoE level is dropped below another threshold, the EBR should be increased.

The EBR can be used for functions performed in the RAN (e.g., admission control and on-the-fly radio resource management (RRM) functions) in the uplink and downlink directions. The admission control function can use a statistical EBR to make admission decision. Because the EBR is not higher than the max rate, the used of EBR will typically allow admission of more flows to the network. A statistical value of the EBR can be obtained based on the long-term data collection. The radio resource dimensioning can be made using the dynamic effective rate, which could be varied during the session connection, instead of a fixed max rate parameter to avoid resource over provisioning.

Figure 2:
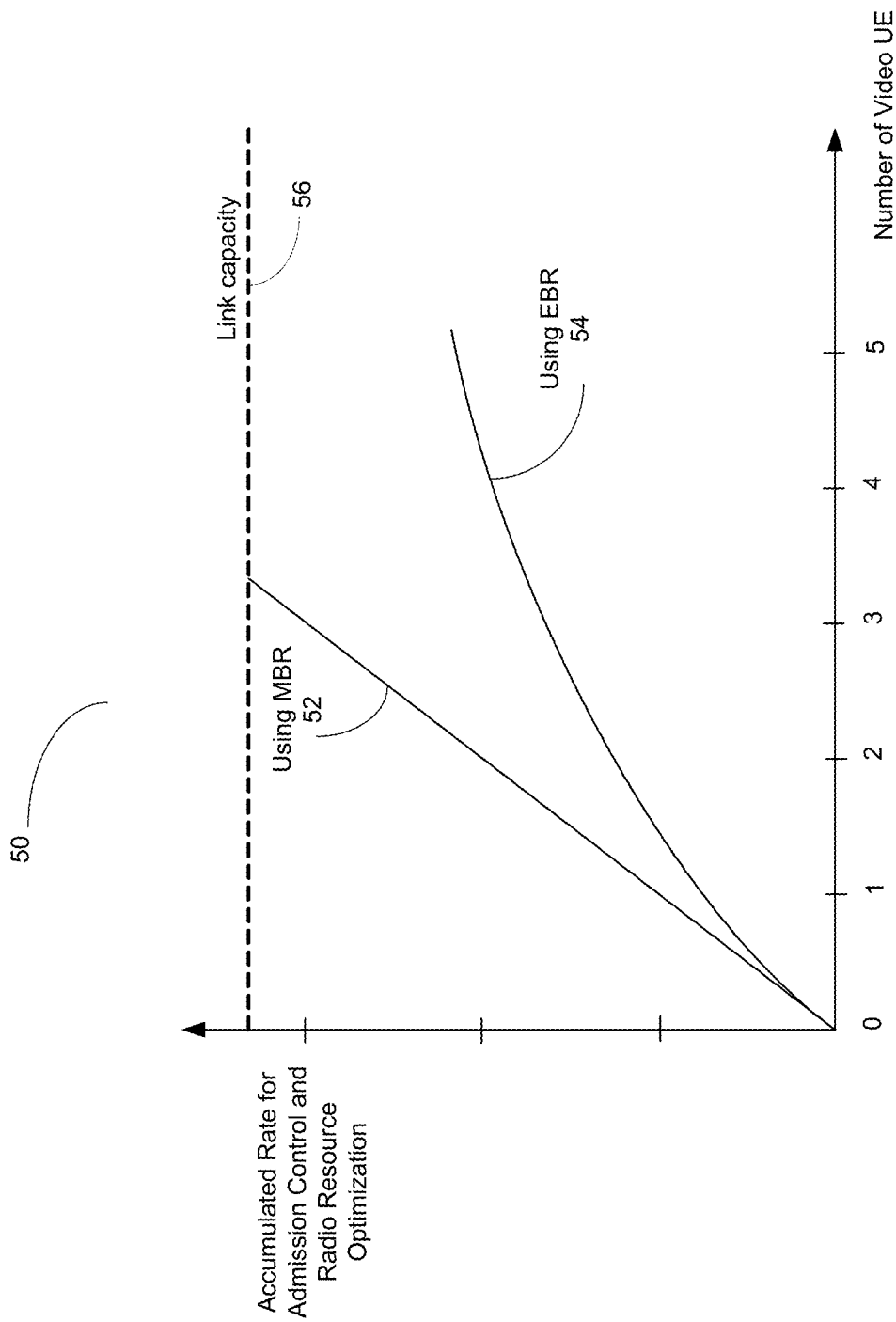
FIG. 2 is a graph illustrating the impact of using MBR and EBR for admission control and radio resource optimization.

FIG. 2 is a graph 50 illustrating the impact of using MBR and EBR for admission control and radio resource optimization. The graph 50 shows the MBR curve 52, the EBR curve 54 and the link capacity 56. Using MBR will reduce the number of admitted video flows, while using the EBR can admit more flows to the system and user's QoE and QoS may still be provided.

Figure 3:
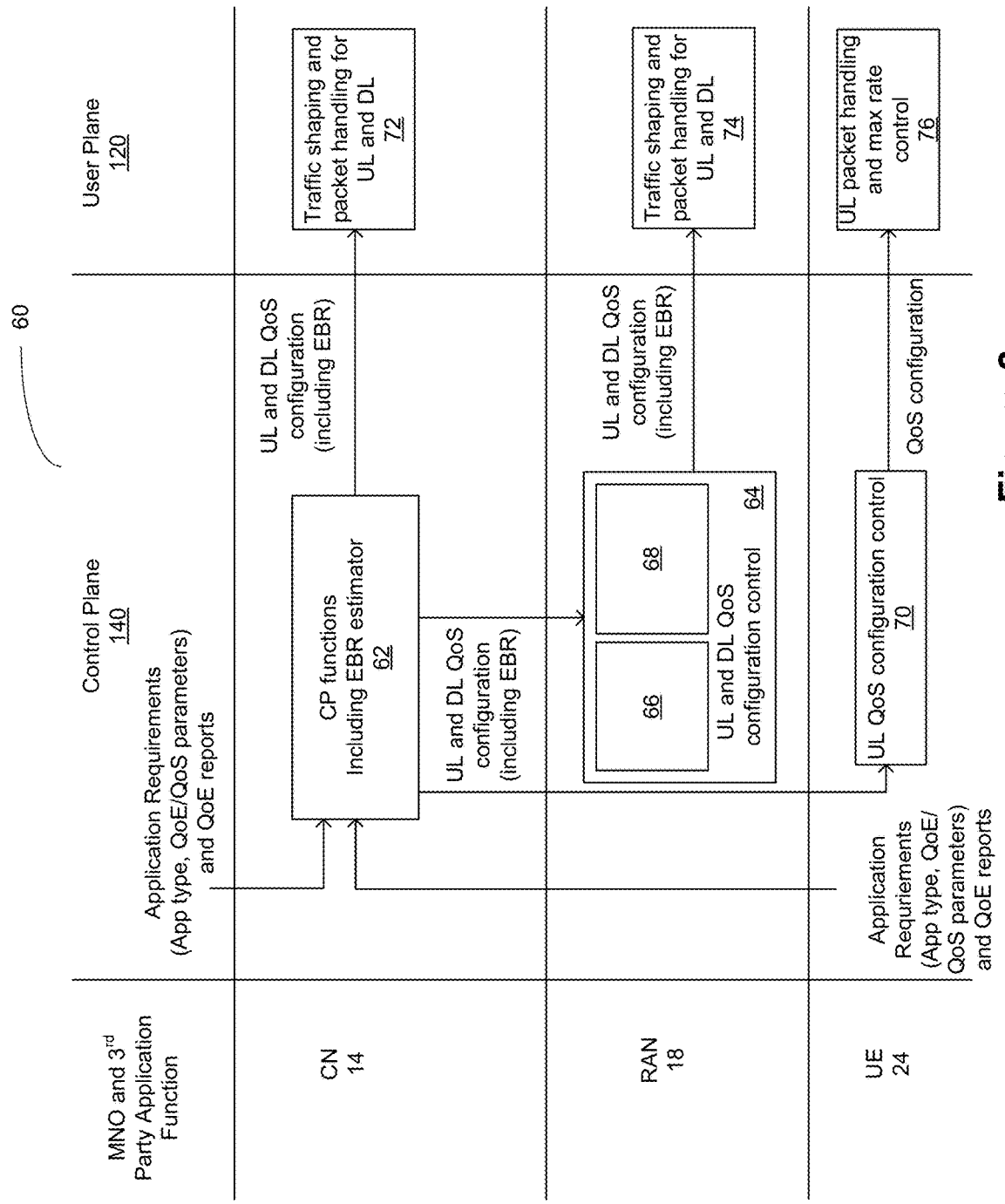
FIG. 3 is a component diagram illustrating the CP with a function to estimate the EBR and some network functions that use EBR.

FIG. 3 is a component diagram 60 illustrating the CP 140 with a function to estimate the EBR 62 and some network functions that can make use of EBR. The network functions include a UL and DL QoS configuration control function 64 in the RAN 18 and the UL QoS configuration control function 70 in the UE. The EBR estimator 62 takes the QoE and QoS application requirements from the service layer (message from the application servers or message from the UE 24) and QoE feedback parameters from the UE 24 to compute statistical and dynamic effective rates. The effective rates can then be sent to the Admission Control 66 and Radio Resource Optimization 68 functions of the RAN 18 (which are in the UL and DL QoS configuration control module 64) and the UP resource management of CN 72 and RAN 74. The UL QoS configuration control function 70 may send a QoS configuration to the UP resource management of the UE 76.

The EBR can be adjusted based on accumulated QoE reports. Unlike QoE reports, which could be sent from UE every few seconds (e.g., 2-10 seconds), the EBR can be adjusted on a longer time scale, for example every tens of seconds, for example, every 10, 30 seconds or longer, depending on the operator's QoE/QoS policy control in order to provide stable QoE levels to users.

The EBR concept for real-time video can be applied to other traffics having variable bit rates, such as voice telephony, and segmented video streaming, e.g., DASH based video streaming, where users send requests to download video segment by segment.

Figure 4A:
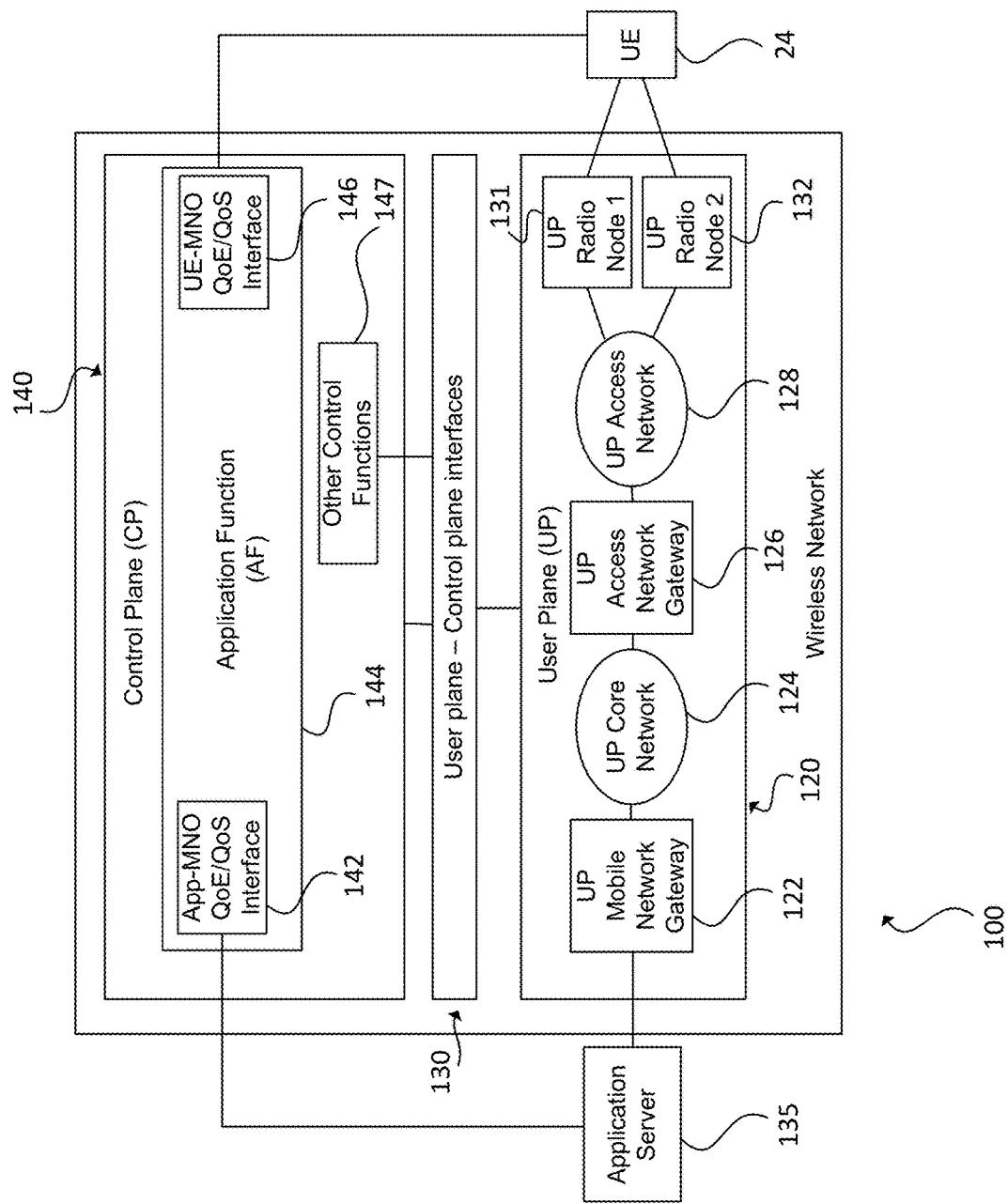
FIG. 4A illustrates an embodiment of a communication network enabled to provide a measure of its QoS capabilities to entities outside of the network.

Referring to FIG. 4A, a mobile network 100 is presented. The mobile network 100 is a next generation network having separated control plane (CP) 140, user plane (UP) 120, and UP-CP interfaces 130 between the CP 140 and the UP 120. The logical separation of the UP 120 and CP 140 illustrated in figure, allows for the configuration of UP functions by CP functions. This allows CP functions to exchange information amongst each other and based on these exchanges, to define configuration parameters that can be send to functions in the UP. In FIG. 4A, the network 100 provides access to external entities to receive QoS information from the network 100 and in some cases to provide connection information to allow the network 100 to adjust its operations to meet a desired QoS level.

In FIG. 4A, a UE 24 may access the mobile network 100 through either radio node 1 131 or radio node 2 132. Radio node 1 131 and radio node 2 132 providing connectivity to the UP access network 128, and through the UP access network gateway 126 the UP core network 124. The boundary of the mobile network 100 is maintained by the UP mobile network gateway 122. The UP mobile network gateway 122 connects to an external application server 135 to gain access to a service such as the Internet.

The CP 130 includes a functional element referred to as an application function element 144 or an application function (AF). In FIG. 4A and in some text herein, the application function element 144 is labeled as AF 144. One skilled in the art will appreciate that the application function element 144 that is internal to the CP of the wireless network is a different element than an application function that is instantiated at an external application server 135. The term application function element 144 (or AF 144) as used herein together with reference number 144 includes a network exposure function (NEF), within the CP, that provides functionality to allow network elements within the CP to securely exchange QoS and QoE related information with external application servers 135 and UEs 24. Those skilled in the art will appreciate that in some embodiments, applications executed upon AS 135 may be referred to as Application Functions, or External Application Functions. The AF 144 monitors QoE/QoS and controls QoS parameter configuration in the UP 120 through the control plane interfaces 130. The CP 140 also includes other control functions 147 necessary for maintaining the UP, but beyond the scope of this application. The AF 144 is connected to an application-MNO QoE/QoS interface 142 and a UE-MNO QoE/QoS interface 146 (the QoS interfaces 142, 146).

Figure 4B:
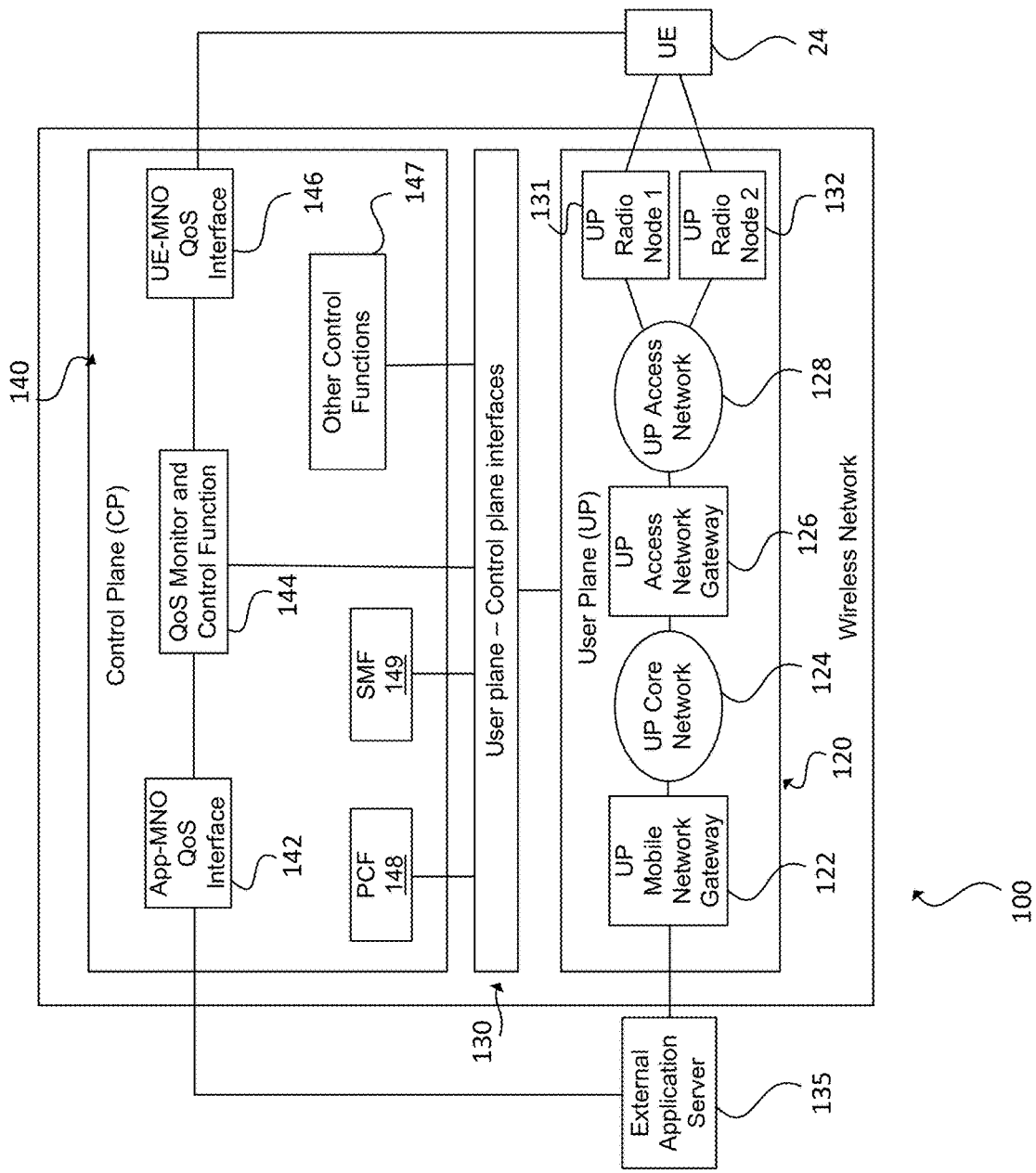
FIG. 4B illustrates another example of a communication network enabled to provide functions and applications executed on AS 135 with access to at least a subset of the QoS management functions available to network functions and applications resident within the network.

FIG. 4B illustrates another example of a communication network enabled to provide functions and applications executed on an external AS 135 with access to at least a subset of the QoS management functions available to network functions and applications resident within the network. The example illustrated in FIG. 4B is similar to the example illustrated in FIG. 4A. In FIG. 4B and in some text herein, the application function element 144 of FIG. 4A is as a "QoS Monitor and Control Function" 144. It is understood that while the labels may be different, the functions are similar. As such, the terms application function element 144, AF 144, NEF 144 and QoS Monitor and Control Function 144 are used interchangeably herein to represent the same network element. It is also understood that it is an implementation option whether to have the QoS interfaces 142, 146 within the QoS Monitor and Control Function 144 as shown in FIG. 4A, or external to the QoS Monitor and Control Function 144 as shown in FIG. 4B.

In FIG. 4B, the QoS interfaces 142, 146 are labeled as "App-MNO QoS Interface" 142 and "UE-MNO QoS Interface" 146. The App-MNO QoS Interface 142 may receive requests to set, modify, change or adapt the QoS of data flows between external application server 135 and the UE 24 within the network 100. The UE-MNO QoS Interface 146 may be used to receive QoS/QoE reports from the UE 24. The information gathered can then be used by CP functions to adjust the manner in which UP functions handle data flows with identified QoS. A policy control function (PCF) 148 and a session management function (SMF) 149 are also shown in FIG. 4B.

In operation, the AF 144 monitors and measures QoE/QoS levels within the UP 120. In addition, the AF 144 is operative to forward QoS information based upon the measured QoE and QoS levels to the QoS interfaces 142, 146. The QoE/QoS interfaces 142,146 providing the QoS information to the external application server 135 and the UE 24 respectively. The QoS information may be selectively provided such that it comprises external application server QoS information and UE QoS information relevant to each of the respective end devices. The external application server 135 and the UE 24 may each use the received QoS information to manage traffic flow. As indicated above, the devices may use the QoS information independent of measured packet delay, or may use the QoS information in combination with measured packet delay.

In an aspect, the network 100 may provide QoS information to one of the application server 135 or the UE 24. For example, the QoS Monitor and Control Function 144 may provide, to at least one of the application server 135 and/or to the UE 24, assigned QoS parameters for data flows between the external application server 135 and the UE 24. The assigned QoS parameters may further be associated with QoS labels which may also be provided, by the QoS Monitor and Control Function 144, to the external application server 135. One example of a QoS parameter is data rate of the data flow, such as any of a mean data rate, a maximum data rate, or a minimum data rate. The NEF 144 may also provide a UE mobility context associated with the UE 24 to the external application server 135. In the aspect, the selected one of the application server 135 or the UE 24 may use the QoS information to manage its communications. For example, the external application server 135 may receive QoS labels associated with QoS conditions available in the network 100. The external application server 135 may then append or attach the QoS labels to packets (e.g., as part of the packet headers) in the data flow. UP functions can also then be configured by CP functions, such as SMF, so that upon receipt of packets with the QoS label, appropriate packet handling can be provided.

In some aspects, the devices may use the QoS information to differentiate between packets communicated through different connections to separate and/or classify the measured packet delay for each of those differentiated packets. In some aspects the QoS information may comprise a data rate for the network 100. In some aspects, the QoS information may comprise a data rate for each connection linking the application server 135 and the UE 24. In some aspects, the QoS information may comprise available flow priority marker options, such as QoS Flow Identifier (QFI) or 5G QoS Indicator (5QI) in 5G system. The differentiation between such packets may be achieved by inserting different QoS labels within the packet headers.

In an implementation, the QoS information may identify a supported communication mode under current network operating conditions. For instance, the QoS information may identify that the network 100 can support HD video flows. In some aspects the QoS information may identify which modes cannot be supported, for instance 4K video flows, leaving it to the entity to select a lower data rate video mode which would be supported.

In an implementation the AF 144 may be operative to receive connection information from the QoE/QoS interfaces 142, 146 based upon information supplied by the external application server 135 and the UE 24, and to effect network control changes to accommodate the requested connection. In the implementation the QoE/QoS interfaces 142, 146 may comprise two-way interfaces each exchanging information between the AF 144 and the respective application server 135 and UE 24.

In an implementation, the application server 135 and/or the UE 24 may be operative to send QoE requirements to the AF 144. In an implementation, the AF 144 may be operative to send QoE requirements to the application server 135 and/or the UE 24. The QoE requirements including, for instance, QoE parameters. For example, the QoE parameters of real-time video services, such as video conferencing, can consist of at least total erroneous time, where the packets of picture frames are not fully received, or the number of service interruptions where the frames cannot be decoded and displayed due to severe packet loss rates. The QoE parameters of none-real-time video services can, for instance, consist of initial buffering time, total re-buffering time and/or the number of service interruptions. In an aspect, either the application server 135 or the UE 24 can send QoE feedback information of on-going flows to the AF 144. In some aspects, the QoE feedback information may be relayed in real-time. In other embodiments the feedback information may be consolidated or aggregated before sending, or may otherwise be delayed before sending. The QoE feedback information may cover a specified period of time, or may cover the duration of the service(s).

In an implementation, a charging method can be exchanged or agreed based on some specific transport protocol. For example, for a transport-layer protocol based on fountain coding, the original packets will be coded. The coded packets are then sent to UE. The number of coded packets could be much larger than the number of the uncoded packets. However, the MNO will charge the data sessions based on the number of uncoded bits of files. Additional charge may be added to the data sessions which require QoE/QoS support from MNO.

Figure 5A:
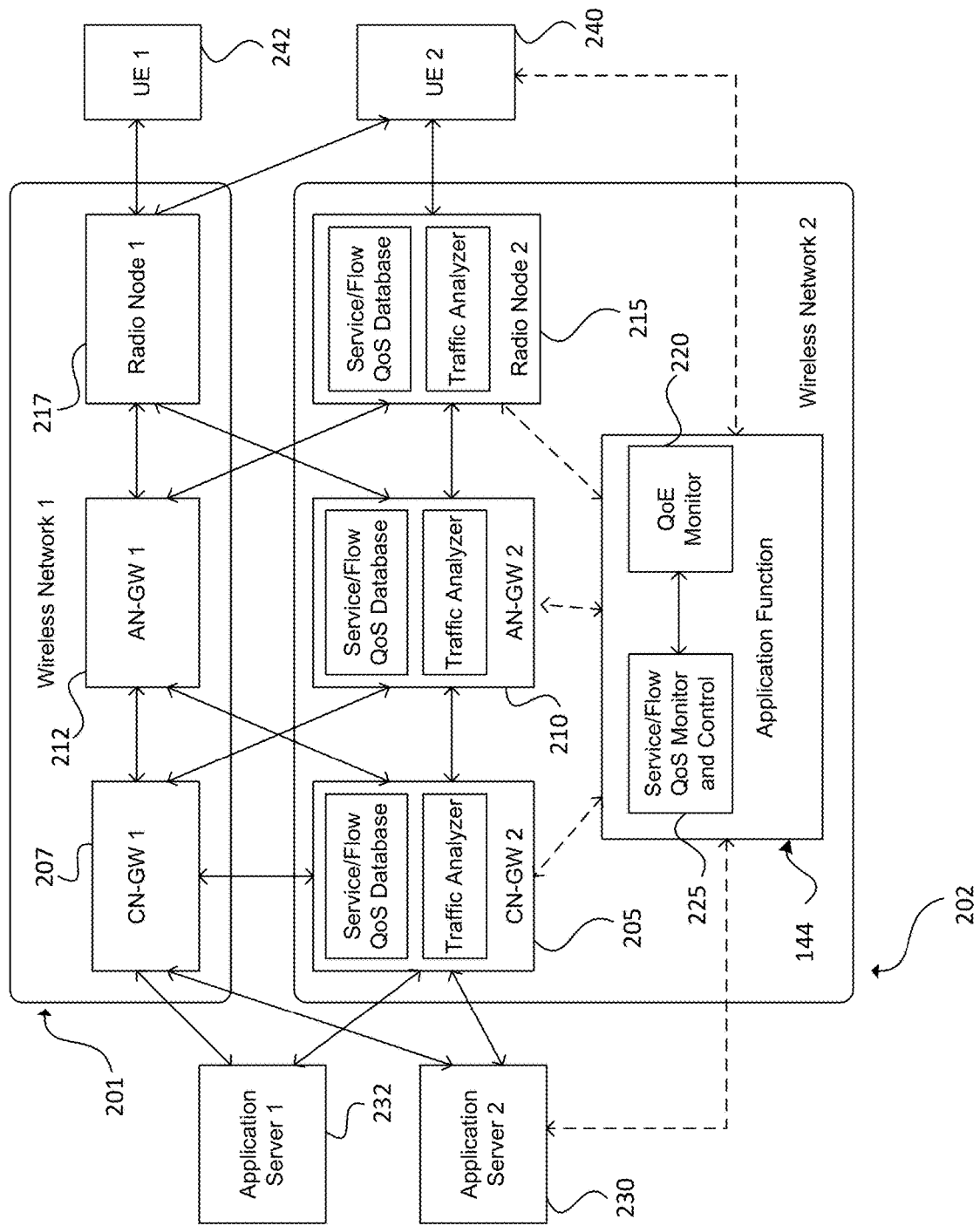
FIG. 5A illustrates an embodiment a communication network enabled to provide a measure of its QoS capabilities to entities outside of the network, and to interoperate with a legacy communication network.

Referring to FIG. 5A, in an embodiment a next generation wireless network 202 is provided which is operative to interact with, and aid, a legacy wireless network 201. It will be apparent to those skilled in the art that this figure does not differentiate between a User Plane and a Control Plane as was done in FIGS. 2A and 2B. The legacy wireless network 201 including a core network gateway (CN-GW) 207, an access network gateway (AN-GW) 212, and at least one radio node 217. The wireless network 202 includes next generation elements including a CN-GW 205, AN-GW 210, and radio node 215. Each of the CN-GW 205, AN-GW 210, and radio node 215 including a traffic analyzer and a service/flow QoS database. The wireless network 202 further comprises the AF 144 which is illustrated as including a service/flow QoS monitor and control element 225 and a QoE monitor 220. It is understood that the AF 144 also includes the QoE/QoS interfaces 142, 146 to exchange information with application server(s) 135 and UE 24.

Figure 5B:
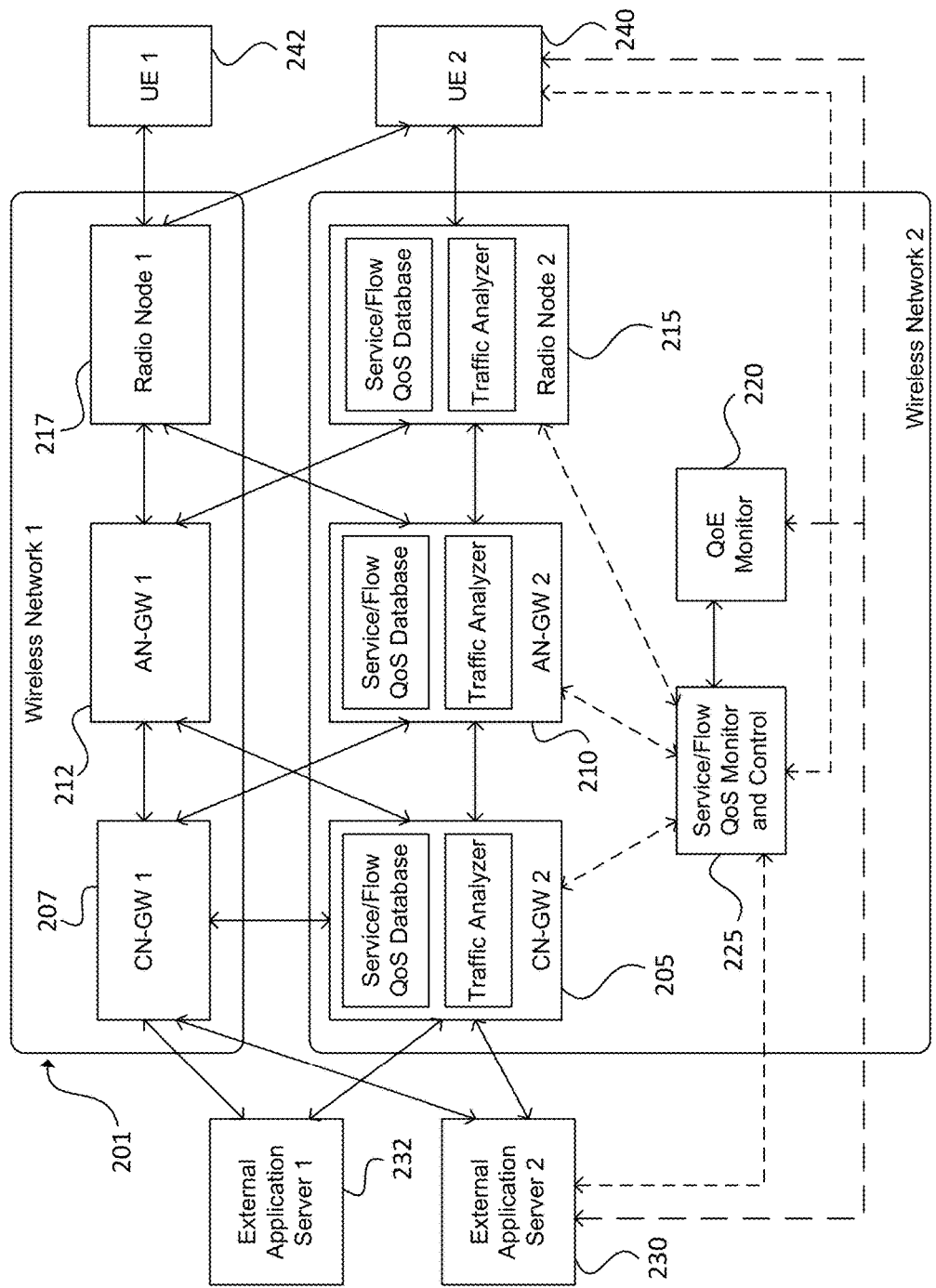
FIG. 5B illustrates another example of a communication network enabled to provide functions and applications executed on AS 135 with access to at least a subset of the QoS management functions available to network functions and applications resident within the network.

FIG. 5B illustrates another example of a communication network enabled to provide functions and applications executed on an external AS 135 with access to at least a subset of the QoS management functions available to network functions and applications resident within the network. In FIG. 5B, the NEF 144 is not shown. It is understood that it is an implementation option whether to have the service/flow QoS monitor and control element 225 and the QoE monitor 220 implemented within the NEF 144 or implemented within another network element. It is also understood that the QoS interfaces 142, 146 may also be included for the service/flow QoS monitor and control element 225 to communicate with an application function instantiated at the external application server 2 230 (QoS interface 142), and to communicate with a UE 2 240 (QoS 146). In the control plan, the service/flow QoS monitor and control element 225 and QoE Monitor element 220 may be implemented within a policy control function (PCF) 148 of the network 202. If implemented in the management plane, the service/flow QoS monitor and control element 225 may be implemented within a network function in the management plane. The service/flow QoS monitor and control element 225 and QoE Monitor element 220 may be implemented in a network data analytics (NWDA) repository or a database or may access a NWDA repository or database.

The service/flow QoS monitor and control element 225 may further comprise one or more interfaces (not illustrated in FIG. 5A) to interface with one or more application servers 230 and one or more UE 2 240. The one or more interfaces are also not illustrated in FIG. 5B. The QoE monitor 220 may further be operative to engage with the interface(s) to evaluate the service received by each of the one or more external application servers 230 and the one or more UE 2 240. The QoE monitor 220 may be operative to exchange the received QoE feedback between each of the one or more external application servers 230 and the one or more UE 2 240 to allow for QoS policy setting adjustment for service and flows. The QoS policy setting adjustment may include QoS parameters such as: the mean bit rate, guaranteed bit rate, maximum bit rate, minimum bit rate, aggregated maximum bit rates, effective rate of data flows of a PDU session and/or packet delay limit. The effective rate is defined as a minimum data rate the system should provide to meet a minimum QoE level. In an aspect, the system resources of radio nodes can be dimensioned by using a radio resource management (RRM) unit. The RRM unit receiving the QoS parameters and using the received QoS parameters to select necessary radio resources, including transmit power, antennas, spectrum, etc.

The networks 201, 202 communicate through the radio nodes 215, 217 to UE 1 242 and UE 2 240, and through the CN-GWs 205, 207 to application servers 230, 232. CN-GW 2 205 is a user plane function (UPF) and may optionally provide a packet data unit (PDU) session anchor function. In order to extend QoS information to the application servers 230,232, and in some aspects to UE 1 242 and/or UE 2 240, the wireless network 202 further includes cross logical links between the CN-GWs 205, 207, AN-GWs 210, 212, and radio nodes 215, 217. The AN-GW 2 210 may be a centralized unit (CU) within a RAN. The radio node 2 215 may be a distributed unit (DU) within the RAN.

The traffic analyzers are operative to identify service-level (e.g., PDU session level) and flow-level (e.g., QoS flow level) of UEs in each of the network nodes. The QoS databases store a mapping between service and service-level QoS and/or flows of a service and flow-level QoS labels. Each or any of the traffic analyzers may optionally include a policy control enforcement function (PCEF). Accordingly, the mobile network 202, also referred to as a wireless network, may provide a QoE/QoS interface that supports the operation of the legacy wireless network 201. In some aspects, the service/flow QoS monitor and control element 225 may be operative to instruct the external application server 230 to a QoS level in a packet header. In some aspects, the external application server 232 or UE 1 242 does not have a connection to the service/flow QoS monitor and control element 225. In the aspects, the traffic analyzers may be used to inspect the packets in order to estimate QoE and QoS levels.

In some aspects, the QoE/QoS interfaces allow the application server 230 to dynamically select transportation protocols, parameters of transportation protocols, and a suitable DiffServ (differentiated service) Code Point for IP packet headers based upon the received QoS information. The QoS interface 142 of FIGS. 2A and 2B may be an N5 interface between the application function instantiated at the external application server 135,230 and the NEF 144 (or another network element that implements the QoS monitor and control element 225). In some aspects, the QoS interfaces allow the application server 230 to dynamically inform the service/flow QoS monitor and control element 225 of the end-to-end transport protocols and parameters, as well as any QoS requirements, to allow the service/flow QoS monitor and control element 225 to make adjustments to network operations. For instance, the service/flow QoS monitor and control element 225 may be operative to select a suitable QoS mapping to service, and to flows of the same service. The service/flow QoS monitor and control element 225 may be operative to set packet data handling procedures: aggregated services-level (e.g., aggregated maximum bit rate of a UE), service-level (e.g., aggregated maximum bit rate of all QoS flows of a PDU session) and flow-level (e.g., QoS flows) rate control packet scheduling priority, packet dropping/forwarding at handover when the UE 2 240 is in motion. A packet data handling procedure for an aggregated services-level may include a procedure to handle multiple PDU sessions terminating in the same data network (DN). The UE 24 may send QoE reports to the QoE monitor 220, or to another function or node within the MNO, and to the external application servers 230. These QoE reports can allow functions within the network 100 to adjust the setting of QoS policy for a network service hosted at the external application server 135,230 and the associated with the QoE reports. The QoS report to EAS 2 230 is typically transmitted by the UE as a transmission towards the EAS 2 230 in the UP.

The QoE/QoS information exchange between the application server 230 and the AF 144 can be performed using existing communication protocols such as web protocols (e.g. HTTP/HTTPS). The MNOs may communicate the relevant contact information (i.e. communication protocols, IP address and port number) of the AF 144 to the application server 230. Alternatively, the QoE/QoS information exchange between the application server 230 and the AF 144 can be performed using a service-based interface (SBI), where the AF 144 provides services such as subscription and notification, request and response. The application server can send a QoE/QoS modification request or subscription request to QoE/QoS events of wireless network. The AF 144 will provide QoE/QoS information to the application server 230 based on the request or subscription of the application server 230. The QoE information exchanged between the UE 24 and the AF 144 can similarly be performed by using existing communication protocols such as web protocols (e.g. HTTP/HTTPS), or other Radio Resource Control (RRC) protocols. In the case of RRC protocols, a function in the UE 24 will receive the QoE report messages generated by the application layer and forward the received QoE report messages to the AF 144 through RRC control channels.

A variety of QoS information may be exchanged through the QoS interfaces. For instance, the application server 230 may provide service/flow information to assist in identifying service/flows, transport protocol information, QoS requirements, and end-to-end QoS requirements. The service/flow information may include, for instance, IP packet header fields: transport protocol, source IP, source port, destination IP, destination port, or flow ID. The transport protocol information may be related to the protocol(s) used to allow the network to adapt with the transport protocol. The transport protocol may be communicated through the packet header, and/or through separate transport protocol information submitted through the QoS interfaces. The use of well-known protocols, such as TCP and UDP, may not be announced in advance, and instead they may be used with the assumption that nodes and functions in the network will be able to identify the protocol from an inspection of the packet headers. Some specific protocols, such as UDP with fountain coding, may use separate message signaling though the App-MNO QoS interface 142 to communicate the same information. The QoS requirements may include, for instance, average rate, max rate, packet delay, jitter, and packet loss rate. The QoS information may also include information pertaining to priority levels that may be assigned to different data flows. For packets originating from UE 2 240 the end-to-end QoS requirements may be set in an IP packet header, the network may then adjust the QoS level as the packets travel through the network 202. For example, at the AN-GW 210, the N3 tunnel header can be used to encapsulate the IP packet from UE, the QFI and 5QI are added to the N3 tunnel header. The CN-GW 205 may be operative to strip out the adjusted QoS level, and reinstate the end-to-end QoS requirement before forwarding the packets on to the external application server 230. For example, the NG-GW 205 removes the N3 tunnel header and send the UE's IP packets to the application server. Within the network 100, communication transmissions of the QoS information may take place over a N3 interface. Outside the network 100, communication transmission of the QoS information may take place over a N6 interface.

In some aspects, the service/flow QoS monitor and control element 225 may be operative to provide additional output QoS information to the application server 230. The additional output QoS information may include, for instance, any one of: service/Flow information to identify service/flow (e.g. flow ID), assigned average rate and/or maximum rate, mobility context of a UE, QoS markers for flows to allow the external application server 230 to set QCI (or DiffServ Codepoint) in packet headers of flows from the same session. The additional output QoS information may further assist with packet handling, scheduling, etc. because no packet inspection is required.

In some aspects, UE 2 240 and the service/flow QoS monitor and control element 225 may have a number of QoS interface parameters that may be exchanged as QoS information. For instance, the UE 2 240 may provide information including: flow identification information (e.g. 5 tuple IP packet header fields: transport protocol, source IP (optional, where a UE has multiple IP addresses), source port, destination IP, destination port; flow ID (SDN implementations); Transport protocol (i.e. TCP, UDP, UDP with fountain coding); and, QoS requirements: average rate, max rate, packet delay, jitter, packet loss rate, priority preference of flows. An IP packet header field may also be known as a flow ID, or QFI, or a traffic description template. The QoS requirements may also include a priority preference of data flows. The service/flow QoS monitor and control element 225 may be operative to provide to the UE 2 240 information such as: flow ID information; assigned average rate and/or maximum rate (periodically updated or on-demand); QoS markers for flows to allow the UE to set QCI (or DiffServ Codepoint) for packets of flows of the same session, according to SLA; and/or a recommended UL transport-layer protocol, depending on the mobility context, multiple connection context. A recommended UL transport-layer protocol may include a reflective QoS mapping protocol.

The service/flow QoS monitor and control element 225 can use the exchanged information to improve resource configuration including: bearer (such as a data radio bearer (DRB)) setup; customizing radio protocols to the transport protocol (e.g. if UDP+fountain coding is used, there is no need to perform packet forwarding at handover); and, adding a flow QCI (e.g. 5QI) marker. The UE 2 240 and the external application server 230 may use the exchanged information to adapt transmission parameters to current network conditions, and to select suitable transport protocols for different mobility scenarios.

In an aspect, for UDP packets, the external application server 230 may inform the service/flow QoS monitor and control element 225 of a flow priority preference and QoS parameters for a given flow/service. The service/flow QoS monitor and control element 225 may then be operative to receive packets and to analyze the IP header information in each packet to identify a flow identity to match to the information received from the external application server 230. The service/flow QoS monitor and control element 225 may be further operative to handle the received packets based upon the received flow priority preference and QoS parameters and the identified flow identity.

Figure 6A:
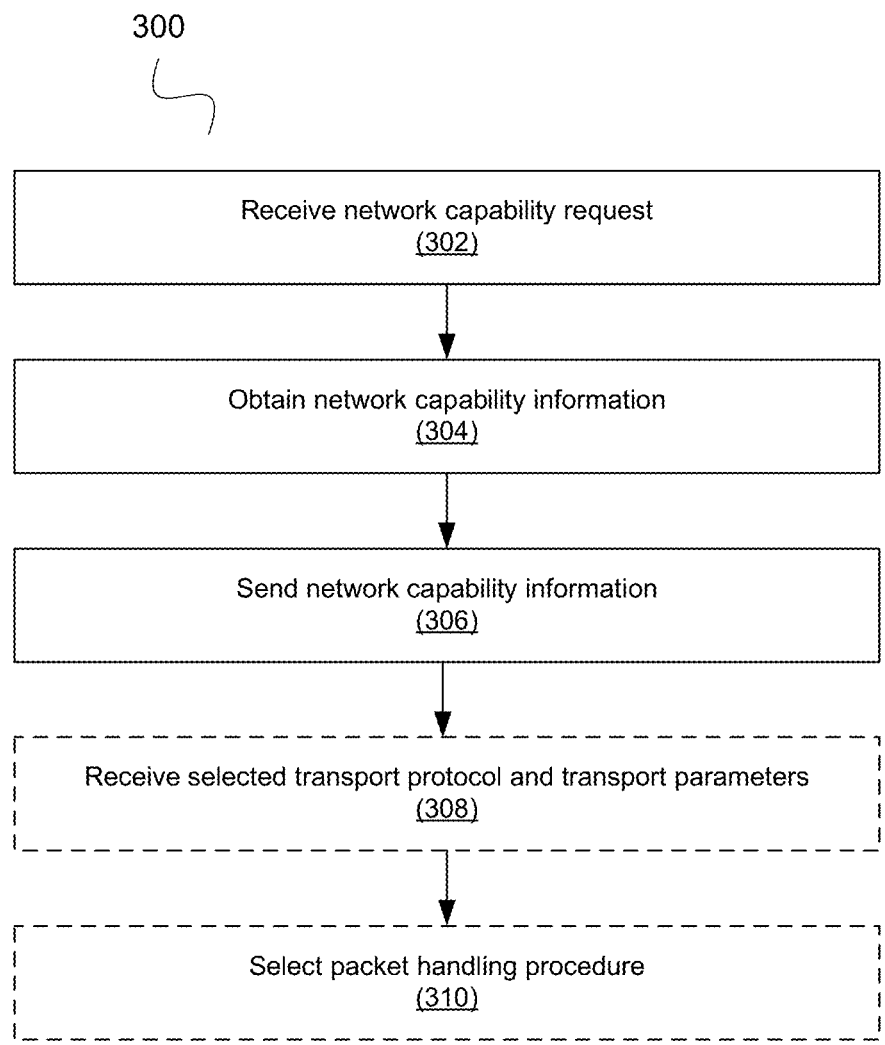
FIG. 6A is a flowchart illustrating a method of communicating network capability information, in accordance with embodiments of the present invention.

FIG. 6A illustrates, in a flowchart, an example of a method of communicating network capability information (300), in accordance with embodiments of the present invention. The method (300) may be performed by a network element such as the NEF 144, or by another network element in the control plane of the core network. The network element may be configured to receive a network capability request (302) from an external application server 135,230. The request may be from an application function instantiated on the external application server 135,230. The network element may then obtain the network capability information (304) from a repository or from a network function such as PCF 148 or an SMF 149. The network capability information may be as described above. Next, the network element may send the obtained network capability information (306) to the external application server 135,230 (e.g., to the application function instantiated on the external application server 135,230). Other steps may be added to the method (300), such as receiving (308) from the application server 135,230 a selected transport protocol and transport parameters for packets in a data flow, and selecting (310) a suitable packet handling procedure to match the transport protocol and transport parameters.

Figure 6B:
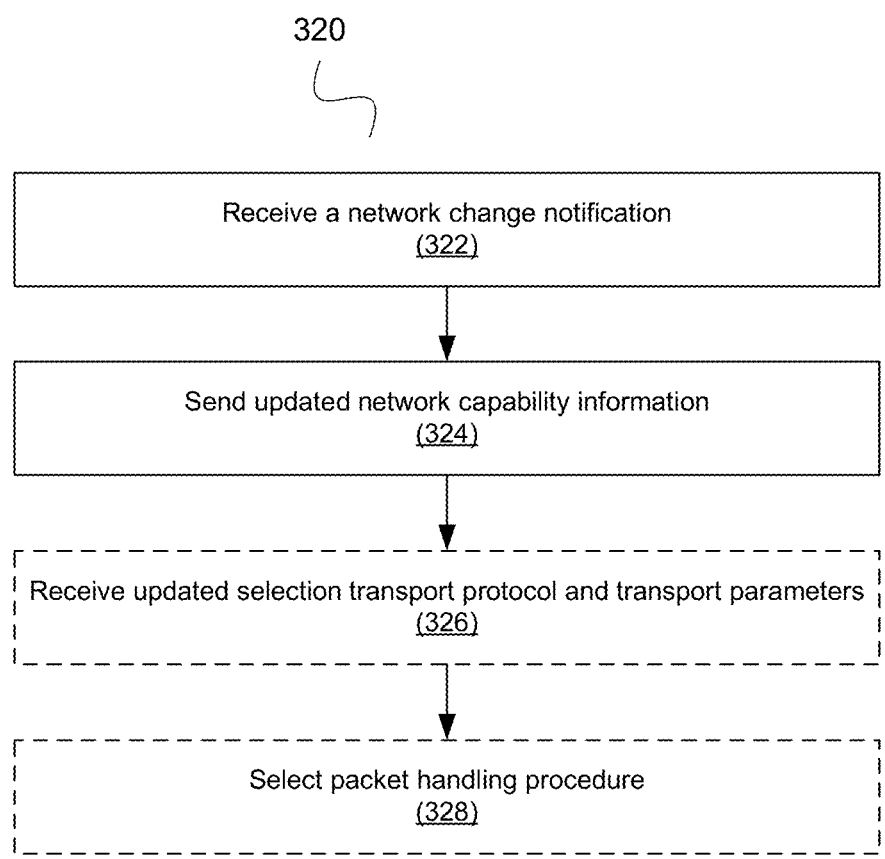
FIG. 6B is a flowchart illustrating a method of communicating network capability information, in accordance with embodiments of the present invention.

FIG. 6B illustrates, in a flowchart, another example of a method of communicating network capability information (320), in accordance with embodiments of the present invention. The method (320) may be performed by a network element in the control plane of the core network, such as the NEF 144. The network element may be configured to receive a change notification (322) from a node or function within the RAN indicating that there is a change in a network condition and/or the UE context. For example, there may be a change in the available network resources (e.g., there may be fewer or more total resources, or lower or higher levels of some resources). The network element may send updated network capability information (324) to the external application server 135,230. Other steps may be added to the method (320), such as receiving (326) from the application server 135,230 an updated selection of a transport protocol and transport parameters for packets in a data flow, and selecting (328) a suitable packet handling procedure to match the update selection of the transport protocol and transport parameters.

Figure 6C:
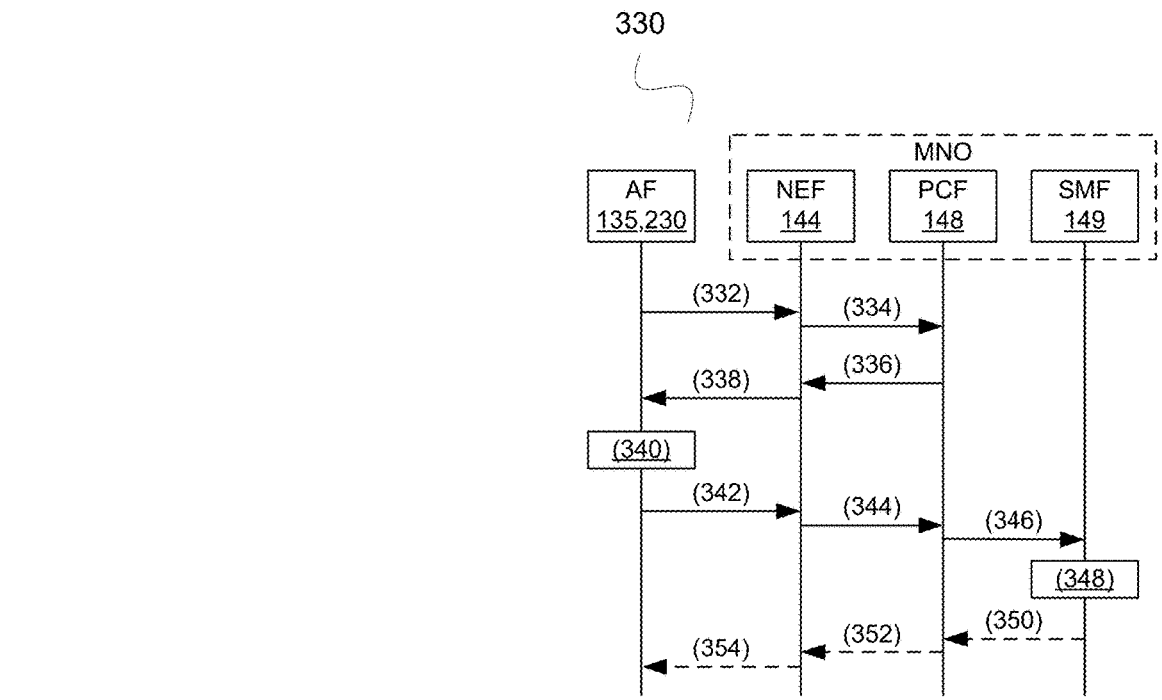
FIG. 6C is a message flow diagram illustrating a method of communicating network capability information, in accordance with embodiments of the present invention.

FIG. 6C illustrates, in a message flow diagram, an example of a method of communicating network capability information (330), in accordance with embodiments of the present invention. A NEF 144 may receive a network capability request message (332) from an application function instantiated on an application server 135,230. The NEF may perform a security check with other CP functions, such as Authentication Server Function (AUSF) and/or Unified Data Management (UDM), to verify whether the messages from the application function is valid. Next, the NEF 144 sends a message (334) based on the received network capability request message to one of the PCF 148. The PCF 148 sends to the NEF 144 the network capability information (336), and the NEF 144 sends the network capability information (338) to the application function instantiated on the application server 135,230. The application function instantiated on the application server 135,230 may now select (340) a suitable transport protocol and protocol parameters for a data flow based on the network capability information.

The NEF 144 may receive a notification message (342) from the application function instantiated on the application server 135,230 that provides the selected transport protocol and protocol parameters. The NEF 144 may send a message (344) to the PCF 148 based on the notification message (342) received from the application function. The PCF 148 may send a message (346) to the SMF 149 based on the notification message (344) received from the NEF 144. The SMF 149 may now select a suitable handling procedure to match the transport protocol and protocol parameters (348). Optionally, the SMF 149 may send a notification response message (350) to the PCF 148 which may, in turn, send a notification response message (352) to the NEF 144 which may, in turn send a notification response message (354) to the application function instantiated on the external application server 135,230.

Figure 6D:
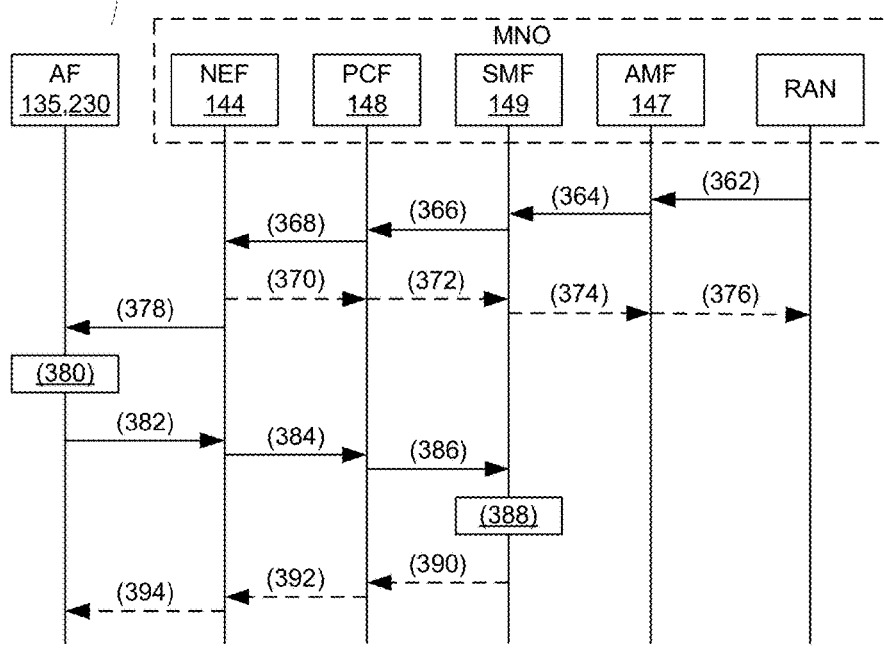
FIG. 6D is a message flow diagram illustrating a method of communicating network capability information, in accordance with embodiments of the present invention.

FIG. 6D illustrates, in a message flow diagram, another example of a method of communicating network capability information (360), in accordance with embodiments of the present invention. The RAN may send a change notification message (362) to the AMF 147 that indicates a change in the network condition and/or the UE context. The AMF 147 may send a message (364) to the SMF 149 based on the change notification message received from the RAN. Alternatively, the RAN may send the change notification message directly to the SMF 149 if there is a change in UPF conditions. The SMF 149 may then send a notification message (366) to the PCF 148 based on the notification message the SMF 149 received. Alternatively, the RAN may send the change notification message directly to the PCF 148 if there is a change in the UPF, CU or DU.

The NEF 144 may receive the change notification message (368) from the PCF 148. The NEF 144 may optionally send a notification response message (370) to the PCF 148 which may, in turn, send a notification response message (372) to the SMF 149 (or directly to the element that sent the PCF 148 the change notification message). The SMF 149 may send a notification response message (374) to the AMF 147 (or directly to the element that sent the SMF 149 the change notification message). The AMF 147 may send a notification response message (376) to the RAN. The response message can be sent any time after the request message is received. For example, the AMF 147 receives notification message (362), the AMF 147 can send notification message (376) before, in parallel, or after sending message (364) to the SMF.

The NEF 144 may send a network capability update message (378) to the application function instantiated on the external application server 135,230 to provide updated network capability information based on the change to the network conditions and/or UE context. The application function instantiated on the application server 135,230 may now select (380) a transport protocol and protocol parameters for a data flow based on the updated network capability information. The selection may be the same transport protocol and/or protocol parameters (or no change).

The NEF 144 may receive a notification message (382) from the application function instantiated on the application server 135,230 that provides the selected transport protocol and protocol parameters. The NEF 144 may send a message (384) to the PCF 148 based on the notification message received from the application function. The PCF 148 may send a message (386) to the SMF 149 based on the message received from the NEF 144. The SMF 149 may now select a suitable handling procedure to match the transport protocol and protocol parameters (388). Optionally, the SMF 149 may send a notification response message (390) to the PCF 148 which may, in turn, send a notification response message (392) to the NEF 144 which may, in turn send a notification response message (394) to the application function instantiated on the external application server 135,230.

With respect to FIGS. 4C and 4D, it should be noted that in an alternative implementation, a trusted application function instantiated at an external application server may send transmissions directly to the PCF 148 instead of going through the NEF 144. Moreover, it is possible for the NEF 144 to send transmission directly to the SMF 149 in subsequent transmissions after at least a first transmission via the PCF 148. In this case, the PCF 148 would send a SMF location to the NEF 144.

Referring to FIGS. 4E and 4F, exemplary process flows are presented for exchanging information between the external application server 230 and the service/flow QoS monitor and control element 225. In the examples of FIGS. 4E and 4F, the information exchange relates to TCP/IP flows and setting the QoS labels in the packet headers.

Figure 6E:
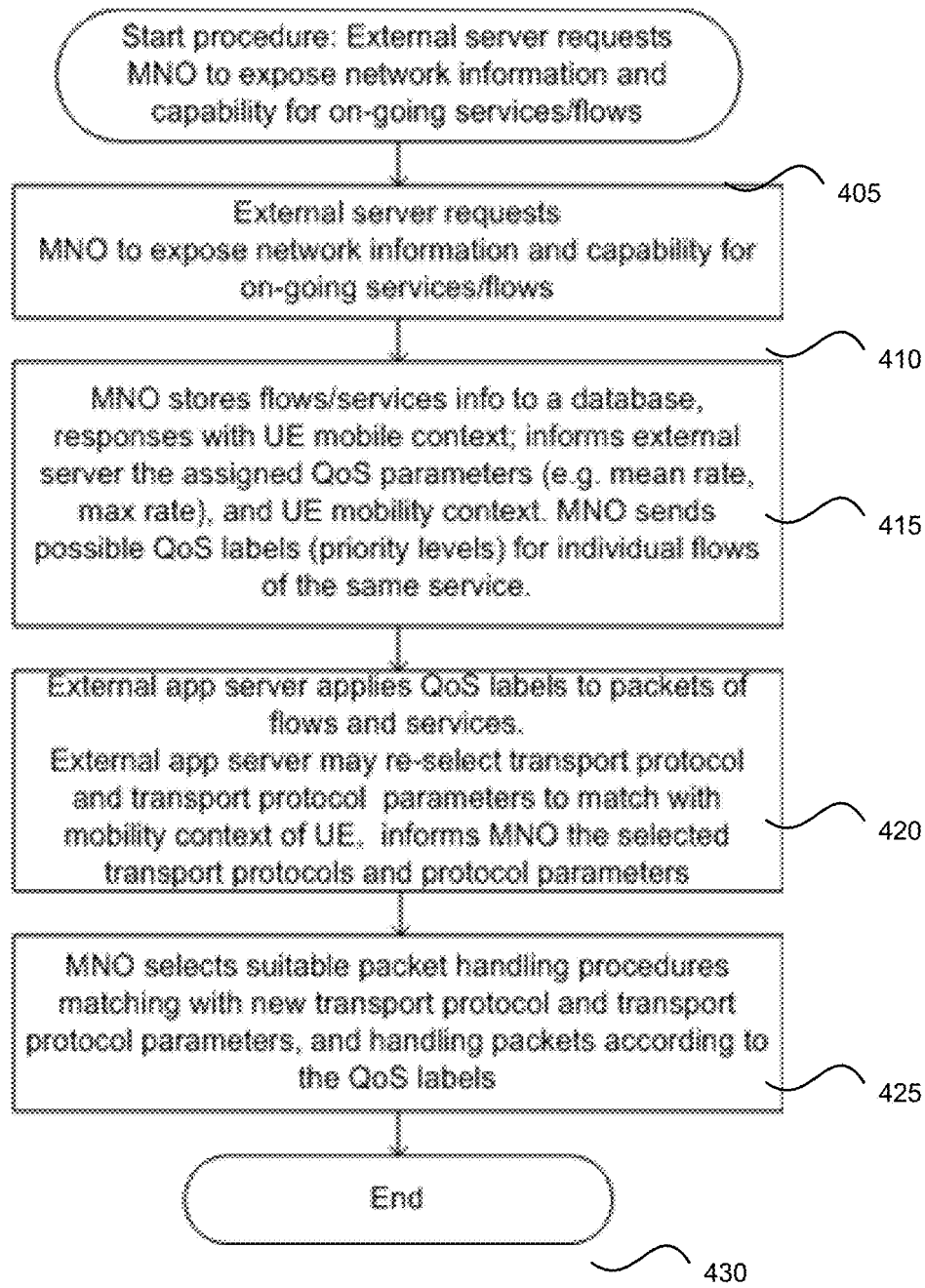
FIG. 6E is a process flow diagram illustrating an embodiment of an information exchange in response to a request for network information.

Referring to FIG. 6E, in step 405, the process starts. In step 410, an application server 230 submits a request to an element of the wireless network 202 to expose network information and a current network capability for on-going services/flows. This request may be from an application function instantiated on the application server 230 to the NEF 144 or PCF 148. In step 415, the element stores flow and service information (i.e. in a database), and responds to the application server 230 with the UE mobile context, the assigned QoS parameters, and possible QoS labels (priority levels) for individual flows of the same service. In step 420, the external application server 230 applies the QoS labels to packets of flows and services. In an aspect, the external application server 230 may re-select a transport protocol and transport protocol parameters to match with the received mobility context. The external application server 230 may further inform the wireless network 202 of the selected transport protocols and protocol parameters. This step 420 may be performed by the application function instantiated on the application server to the NEF 144 or the PCF 148. In step 425, the element of the wireless network 202 selects a suitable packet handling procedure matching with the selected transport protocols and protocol parameters, based upon the QoS labels. The selection of the packet handling procedure may be performed by the SMF 149 that received the selected transport protocols and protocol parameters from the NEF 144 or the PCF 148. The process ends at step 430.

Figure 6F:
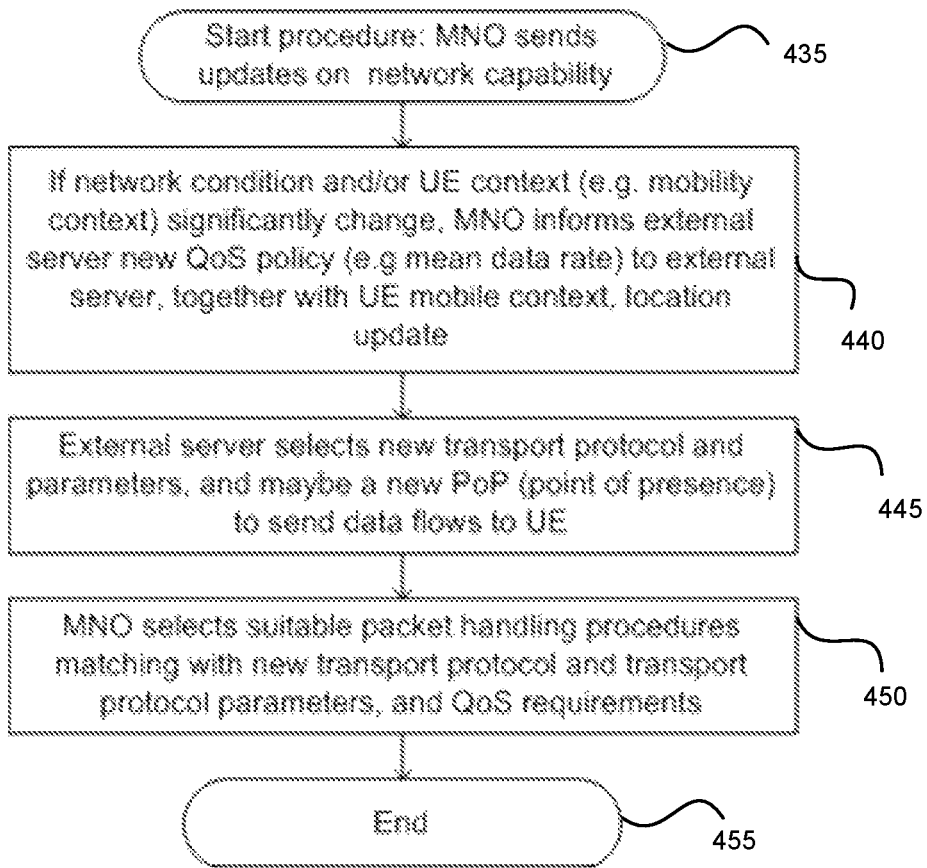
FIG. 6F is a process flow diagram illustrating an embodiment of an information exchange for providing updated network information.

Referring to FIG. 6F, in step 435 the wireless network 202 sends an update on a network QoS capability measure to the external application server 230. In step 440, if a network condition and/or UE mobility context significantly changes, the network 202 forwards an updated QoS policy to the external application server 230. This step 440 may be performed by a RAN sending a change notification message to the AMF 147, SMF 149 and/or PCF 148 as described above. In an aspect, the network 202 may further forward the updated UE mobility context and/or a location update. This forwarding may be performed by the NEF 144 or PCF 148. In step 445, the external application server 230 in response to the received updates may select a new transport protocol and parameters. In an aspect the external application server 230 may select a new point of presence (e.g., new mobile edge computing application server) to send data flows to the UE 2 240. In step 450, the network 202 may select a suitable packet handling procedure to match the new transport protocol, parameters, and QoS requirements. In step 455 the process ends.

Figure 7:
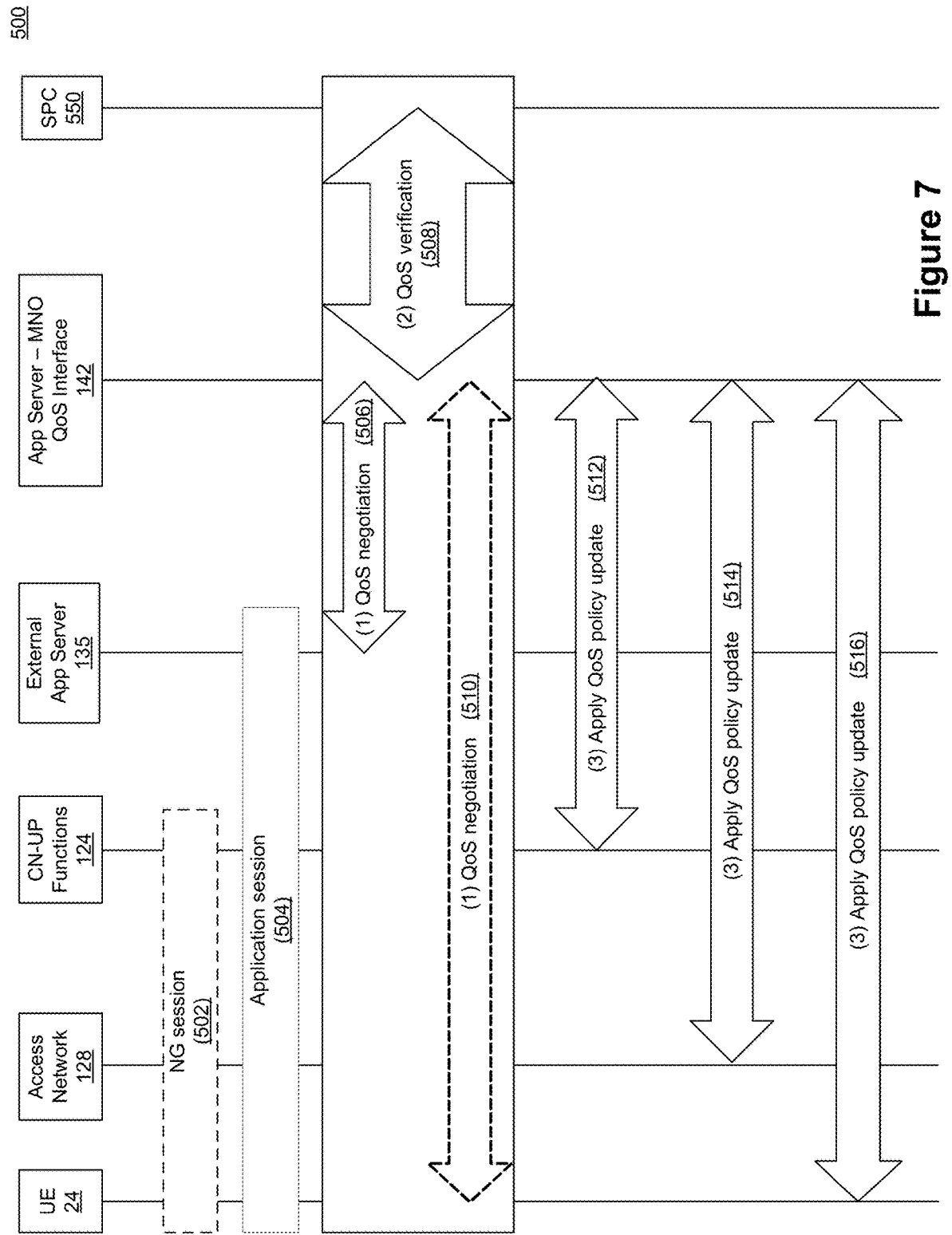
FIG. 7 is a signalling diagram illustrating an embodiment of a QoS negotiation procedure.

Referring to FIG. 7, an embodiment of a QoS negotiation procedure between a UE, an external application server, and a network QoS interface is presented. In the embodiment, the identified network QoS interface includes functions of the service/flow QoS monitor and control element 225 presented above. The App Server—MNO QoS Interface 146 may be provided by the PCF 148 or by the NEF 144. The Subscriber Policy Control (SPC) 550 may be a Unified Data Management (UDR). Based on available network resources, the MNO may provide on-demand cost for certain traffic flows, e.g., on-demand TV/video channels of over-the-top (OTT) services). For example, the MNO may lose the connection or keep a connection based on available resources and the QoS requirement of the MNO's client. Based on the network capabilities and associated costs provided by the MNO to its client, the external application server (e.g., the client's server) may select the most relevant session/flows to assign priority and data rate.

Referring to FIG. 7, a data session, within a network such as a next generation or 5G network, (e.g., a control data session between the UE 24 and one of the AMF 147, SMF 149, or PCF 148) (502) may be established. Next, an application session (e.g., a PDU session) (504) may be established. Next a QoS negotiation procedure may be performed between the External App (Application) Server 135 and the App Server—MNO QoS Interface 142. Next, a QoS verification procedure (508) may be performed between the App Server—MNO QoS Interface 146 and the SPC 550. Next, a QoS negotiation procedure (510) may optionally be performed between the UE and the App Server—MNO QoS Interface 146. Next, the CN-UP Functions and the App Server—MNO QoS Interface 146 apply a QoS policy update (512). Next, the Access Network 128 and the App Server—MNO QoS Interface 146 apply another QoS policy update (514). Next, the UE 24 and the App Server—MNO QoS Interface 146 apply another QoS policy update (516). These steps and procedures are described further below.

In some implementations, the QoS negotiation can happen when the wireless network may not have enough resources in one Access Network 128. In step (508), the wireless network may offer different solutions, for example, reducing the data rate, moving part of traffic flows to other access networks (e.g., data offloading). The data offloading may involve changes of transport network addresses (e.g., IP address and port number) and transmission protocol, where the network interacts with the UE 24 and the External Application Server 135 to apply new changes. The wireless CP function, such as the SMF 149, may request the application server to forward traffic to a new UPF function in step (506). The wireless CP function, such as the SMF 149, may assign a new IP address(es)/IP prefix(es) and new QoS profiles to the UE 24 in step (510) and may ask the UE 24 to use the new settings. In procedure (512), the App-MNO QoS Interface 142, which can be implemented by the PCF 148, may interact with CN-UP through other CP functions, e.g., SMF 149, to apply new QoS settings and/or new transport protocol parameters, and traffic filter description to CN-UP Functions 124 (such as UPF). In procedure (510), the CP functions, such as SMF 149, may reselect new UPF(s) to provide UP connection. The App-MNO QoS Interface 142 may interact with Access Network 128 (e.g., CU), through other CP functions, such as the SMF 149, to provide the new QoS setting in procedure (514). In procedure (514), new radio nodes, including CU and DU nodes, of Access Network 128 may be re-selected to provide UP connection. The App-MNO QoS Interface 142 may interact with the UE 24, through other CP functions (e.g., AMF 147 and SMF 149) to provide new QoS settings and new transport protocol parameters to the UE 24 in procedure (516).

Figure 8A:
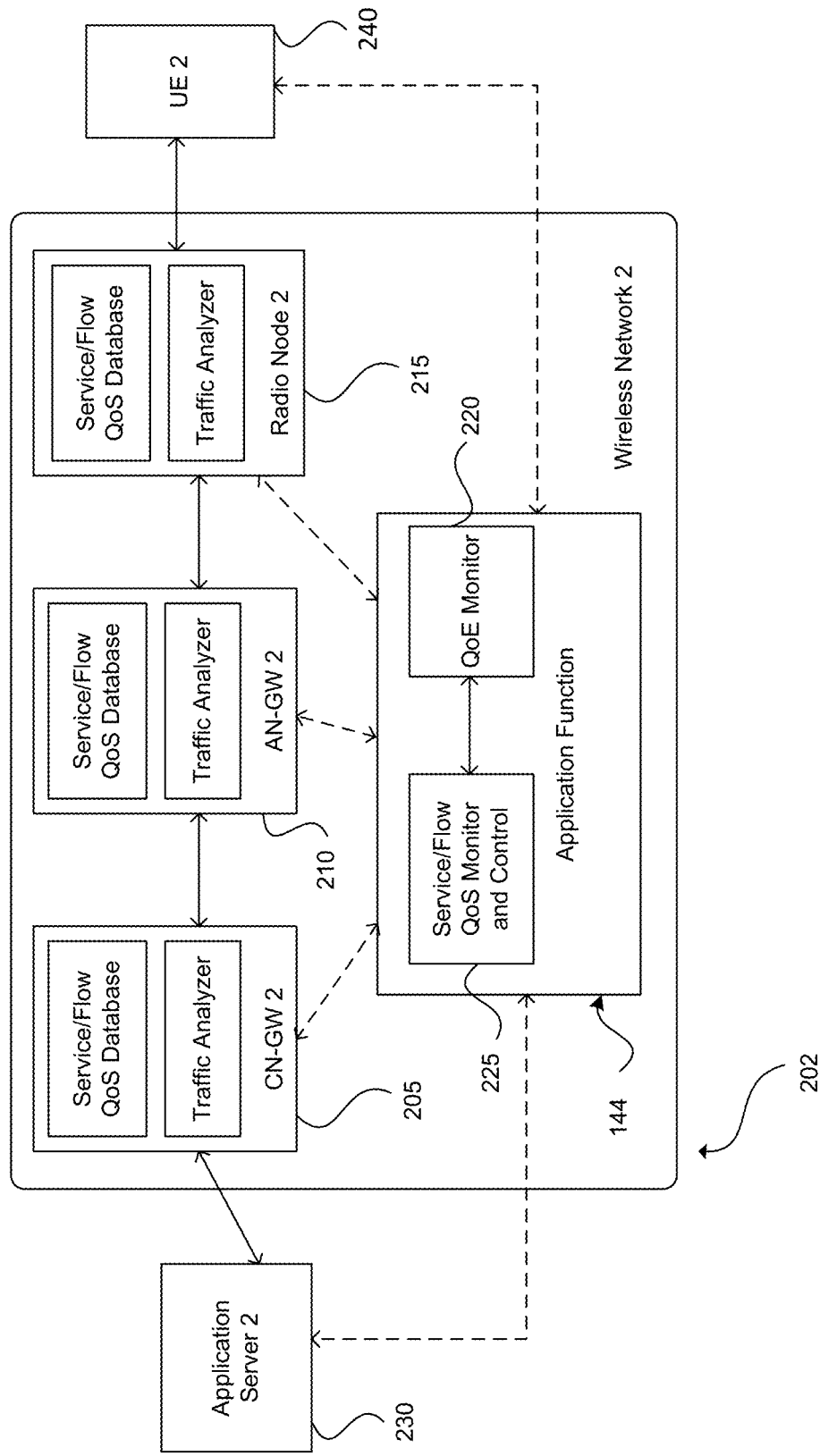
FIG. 8A illustrates an embodiment of a communication network enabled to provide a measure of its QoS capabilities to entities outside of the network.
Figure 8B:
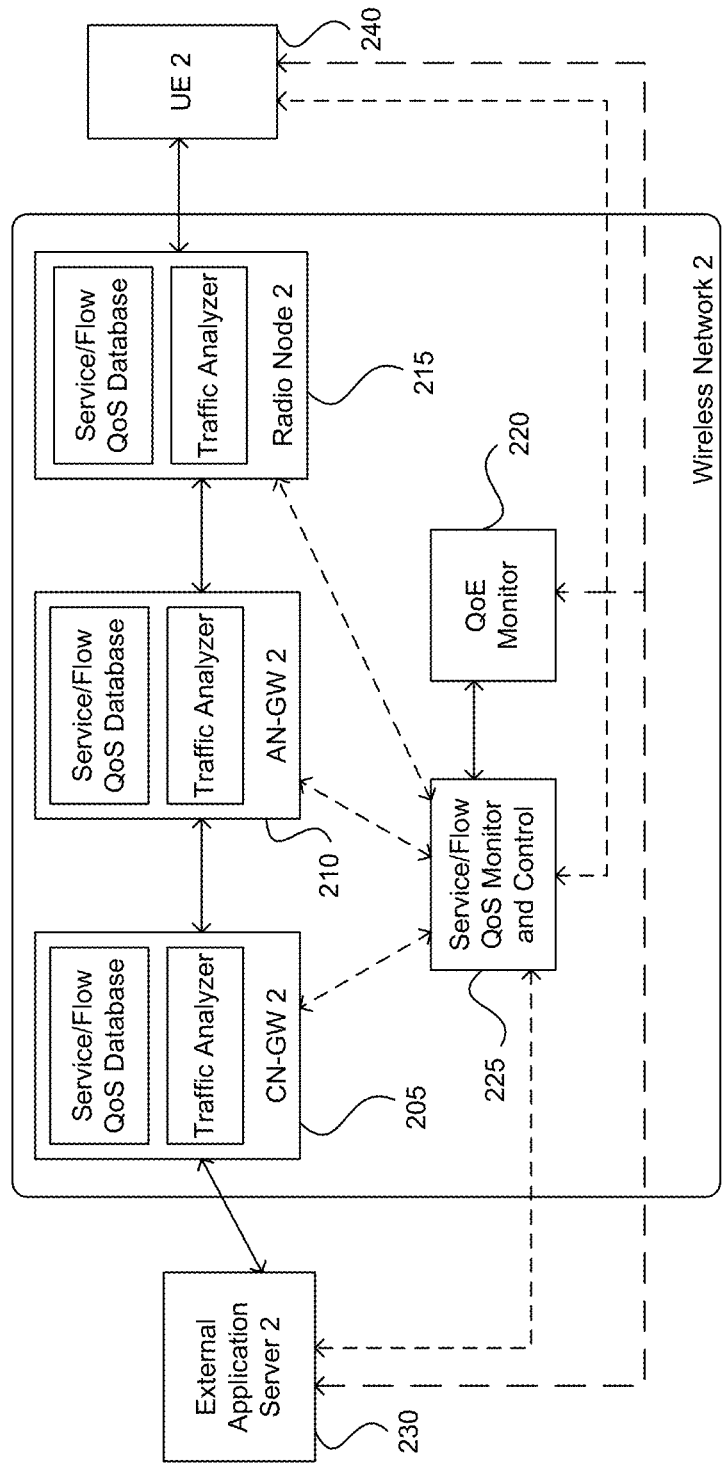
FIG. 8B illustrates another example of a communication network enabled to provide functions and applications executed on AS 135 with access to at least a subset of the QoS management functions available to network functions and applications resident within the network.

Referring to FIG. 8A, the network 202 of FIG. 5A is represented without interoperation with a legacy network 201. A scenario where a UE 2 240 is communicating with the network 202, and all packets are sent through network 202. FIG. 8B illustrates the network 202 of FIG. 5B, which is another example of a communication network enabled to provide functions and applications executed on AS 135 with access to at least a subset of the QoS management functions available to network functions and applications resident within the network.

Figure 9:
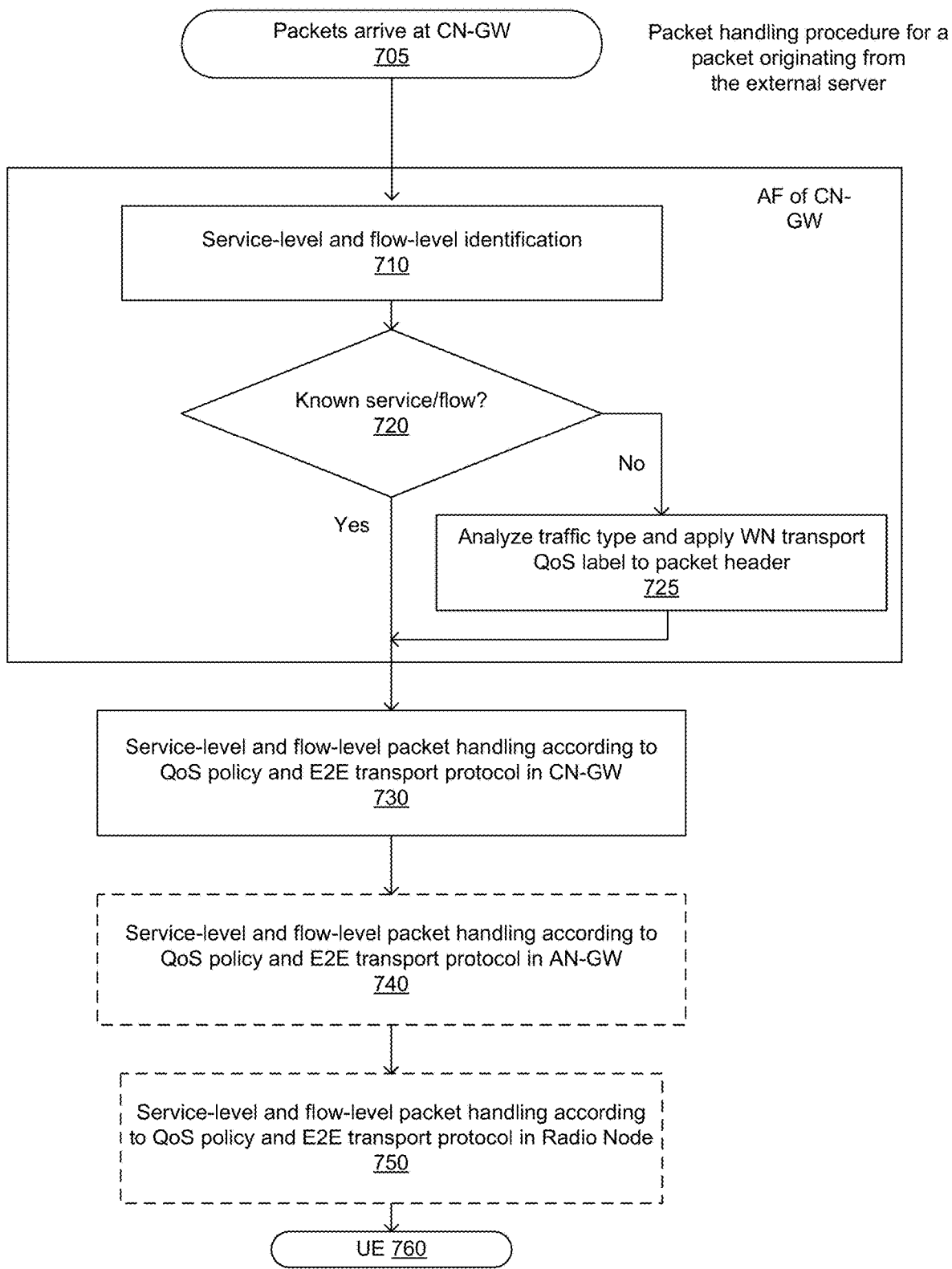
FIG. 9 is a process flow diagram illustrating an embodiment of downlink packet handling including QoS.

Referring to FIG. 9, a process flow diagram is presented to illustrate an embodiment of a procedure to handle downlink packets to be sent to the UE 2 240. At step 705 packets arrive at the CN-GW 205. At step 710, an application function of the CN-GW 205, inspects each packet to identify a service level (e.g., PDU session) and/or a flow-level (e.g., QoS flows of PDU session). It is understood that the application function here refers to a network function of the CN-GW 205. At step 720 the identified service-level and flow-level is evaluated to determine if it is known. If the identified service-level and flow-level is unknown, in step 725 the packet header will be analyzed and a QoS label (e.g., QFI and 5QI, or DiffServ Code Point of TCP packet) is set for this packet. If the identified service-level and flow-level is known, or after the QoS label has been set, in step 730 the packets are scheduled according to the QoS policy and end-to-end transport in CN-GW 205, based upon the identified service-level and flow-level and/or the QoS label mapping. Step 730 may be performed by a UPF in the CN. Optionally in step 740, the packets may be scheduled according to the QoS policy and end-to-end transport in AN-GW 210, based upon the identified service-level and flow-level. Step 740 may be performed by a CU in a RAN. Optionally at step 750, the packets may be scheduled according to the QoS policy and end-to-end transport in RN 215, based upon the identified service-level and flow-level. Step 750 may be performed by a DU in the RAN. At step 760 the packets are forwarded to the end point, UE 2 240.

In some aspects, at the CN-GW 205, packets may be scheduled or dropped based on: the rate policy (mean and max rates of QoS flows, guaranteed bit rate, aggregated maximum bit rate of QoS flows of PDU session), packet delay limit, the end-to-end transport protocol between the external application server 230 and the UE 2 240. For example, fountain coded packets can be dropped instead of uncoded packets.

In some aspects, at the AN-GW 210, packet handling may be used to control the rate and packet scheduling for packets sent to the radio node 215.

In some aspects, at the radio node 215, packets may be scheduled or dropped based on: the rate policy (mean and max rates), packet delay limit, the end-to-end transport protocol between the external application server 230 and the UE 2 240. For example, fountain coded packets can be dropped instead of uncoded packets.

Figure 10:
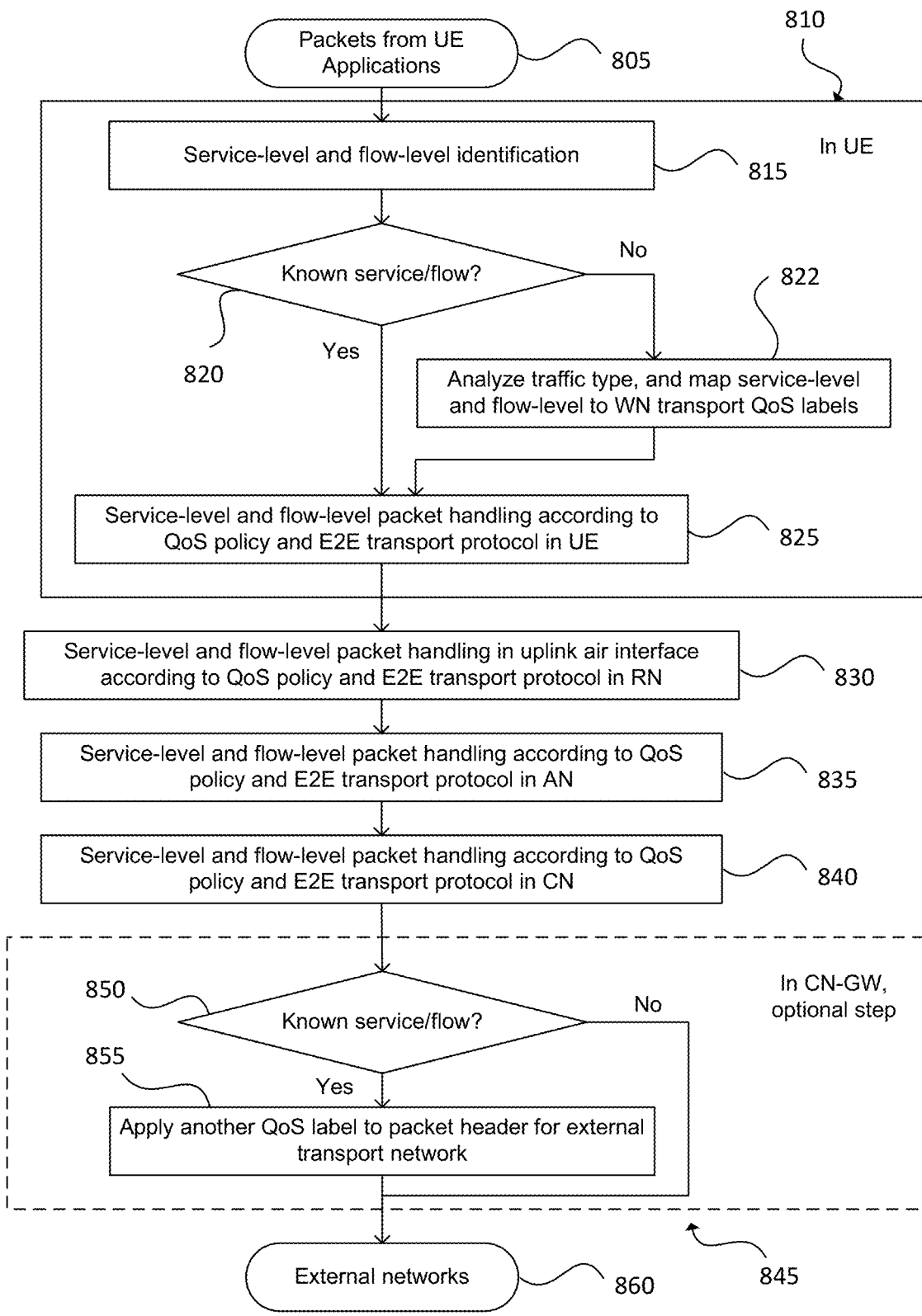
FIG. 10 is a process flow diagram illustrating an embodiment of uplink packet handling including QoS.

Referring to FIG. 10, a process flow diagram is presented to illustrate an embodiment of a procedure to handle uplink packets to be sent from the UE 2 240. In step 805 an application in the UE 2 240 receives packets generated by UE applications to be sent over the network 202. Steps 815 to 825 in section 810 are performed by the UE. The UE is operative at step 815 to identify a service-level (e.g., PDU session) and/or flow-level (e.g., QoS flows of PDU session) for each packet. In step 820, the UE evaluates the identified service-level and/or flow-level to determine whether it is known or unknown. If unknown, in step 822 the UE evaluates the packet header to identify a traffic type and to apply a wireless network transport QoS label to the packet header. The wireless network transport QoS label mapping to a known service-level and flow-level. In step 825, if the identified service-level and flow-level is known, or after the QoS label has been set, the packets are scheduled according to the QoS policy and end-to-end transport between UE 2 240 and the intended recipient, based upon the identified service-level and flow-level and/or QoS label mapping. In step 830 the radio node 215 may handle the packet based upon the QoS policy and the end-to-end transport protocol in the radio node 215. Step 830 may be performed by a DU in the RAN. In step 835 the AN 210 may handle the packet based upon the QoS policy and the end-to-end transport protocol in the AN 210. Step 835 may be performed by a CU in a RAN. In some aspects, rate control can be enforced if UE 2 240 has multiple RAT connections to the same AN-GW 210. Then packet handling (including rate control and packet scheduling/dropping) may be required to prevent violating QoS policy, and/or to reduce congestion. In step 840 the CN 205 may handle the packet based upon the QoS policy and the end-to-end transport protocol in the CN 205. Step 840 may be performed by a UPF in the CN.

Optionally, steps 850 to 855 in section 845 are performed by a UPF in the CN. In step 850, the UPF evaluates the identified service-level and/or flow-level to determine whether it is known or unknown to the UPF. If known, (for example, the unstructured packet belongs to a known Internet of Things (IoT) service provider) the UPF may apply another QoS label (e.g., DiffServ Code Point) to the packet header to send the packet to an external transport network. An example of an external transport network is IPv6/UDP. At step 860 the packets are forwarded to their destinations in the external network(s) (e.g., Data Network).

Figure 11A:
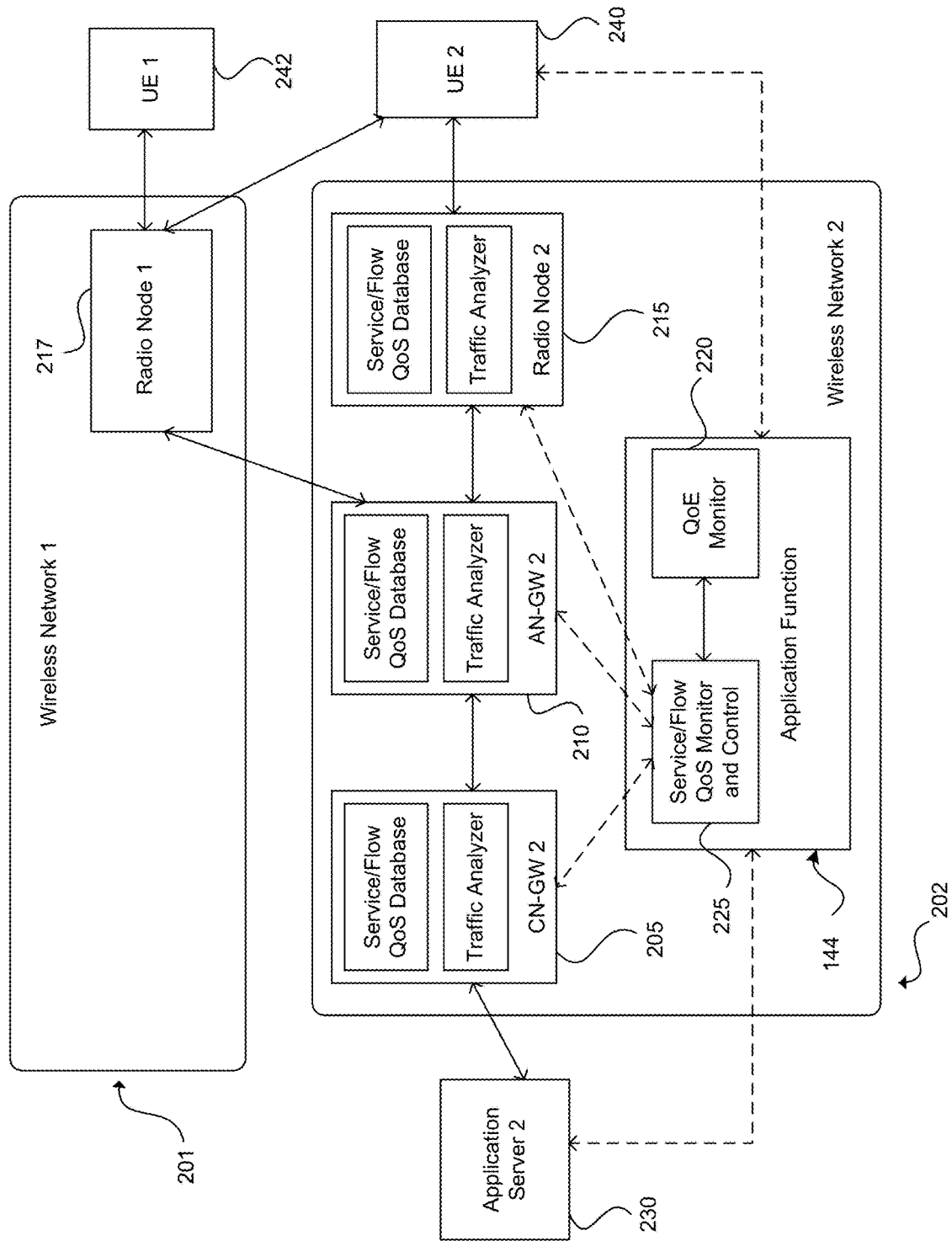
FIG. 11A illustrates an embodiment a communication network enabled to provide a measure of its QoS capabilities to entities outside of the network, and to interoperate with a legacy radio node.
Figure 11B:
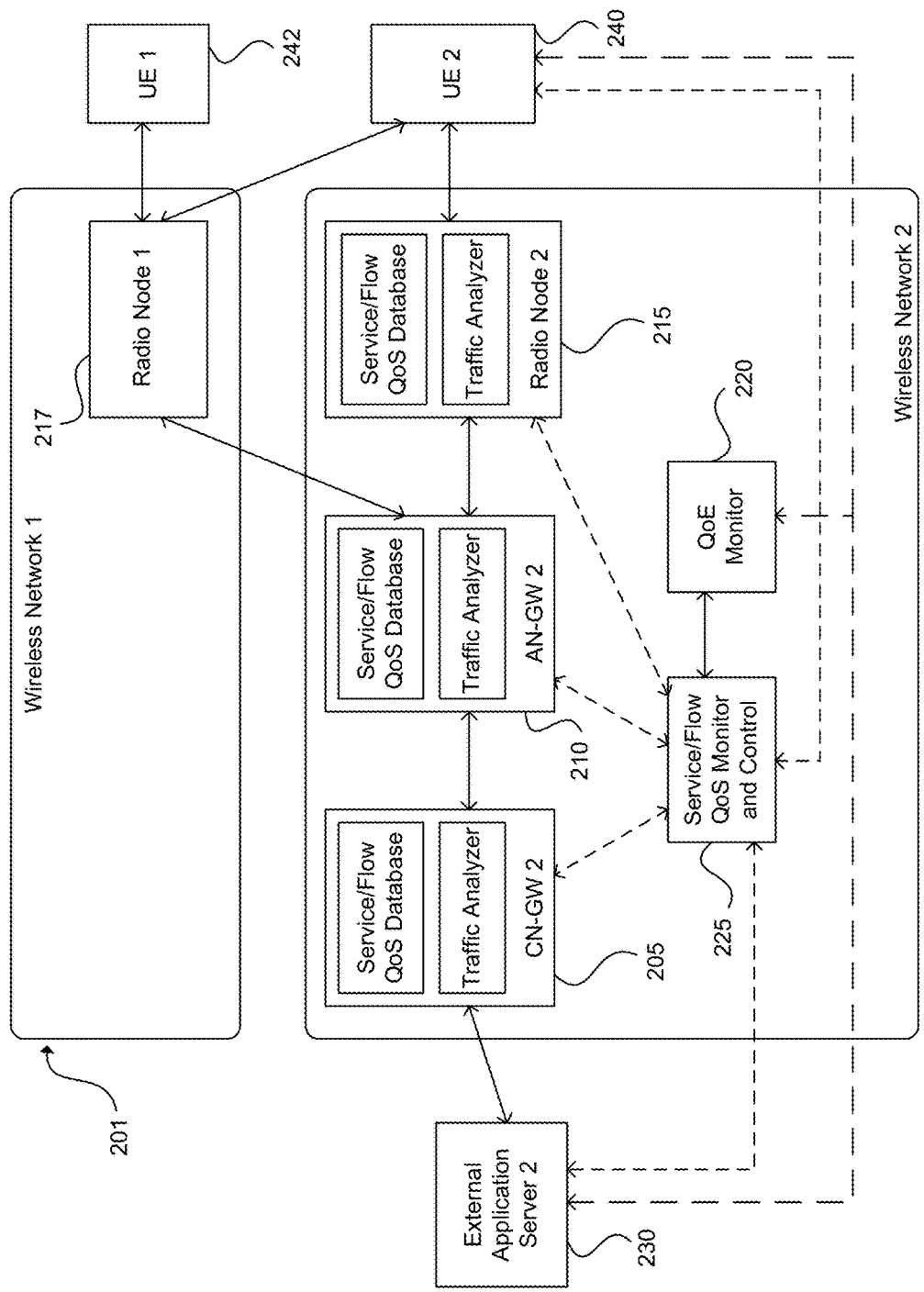
FIG. 11B illustrates another example of a communication network enabled to provide a measure if its QoS capabilities to entities outside of the network, in accordance with embodiments of the present invention.

Referring to FIG. 11A, a simplified version of FIG. 5A is presented where only the radio node 1 217 of the legacy wireless network 201 is involved in the QoS control. In the example, for instance, the UE 2 240 may have multiple RAT connections (radio node 1 217 and radio node 2 215) to the same AN-GW 210. Similarly, FIG. 11B illustrates a simplified version of FIG. 5B.

Figure 12:
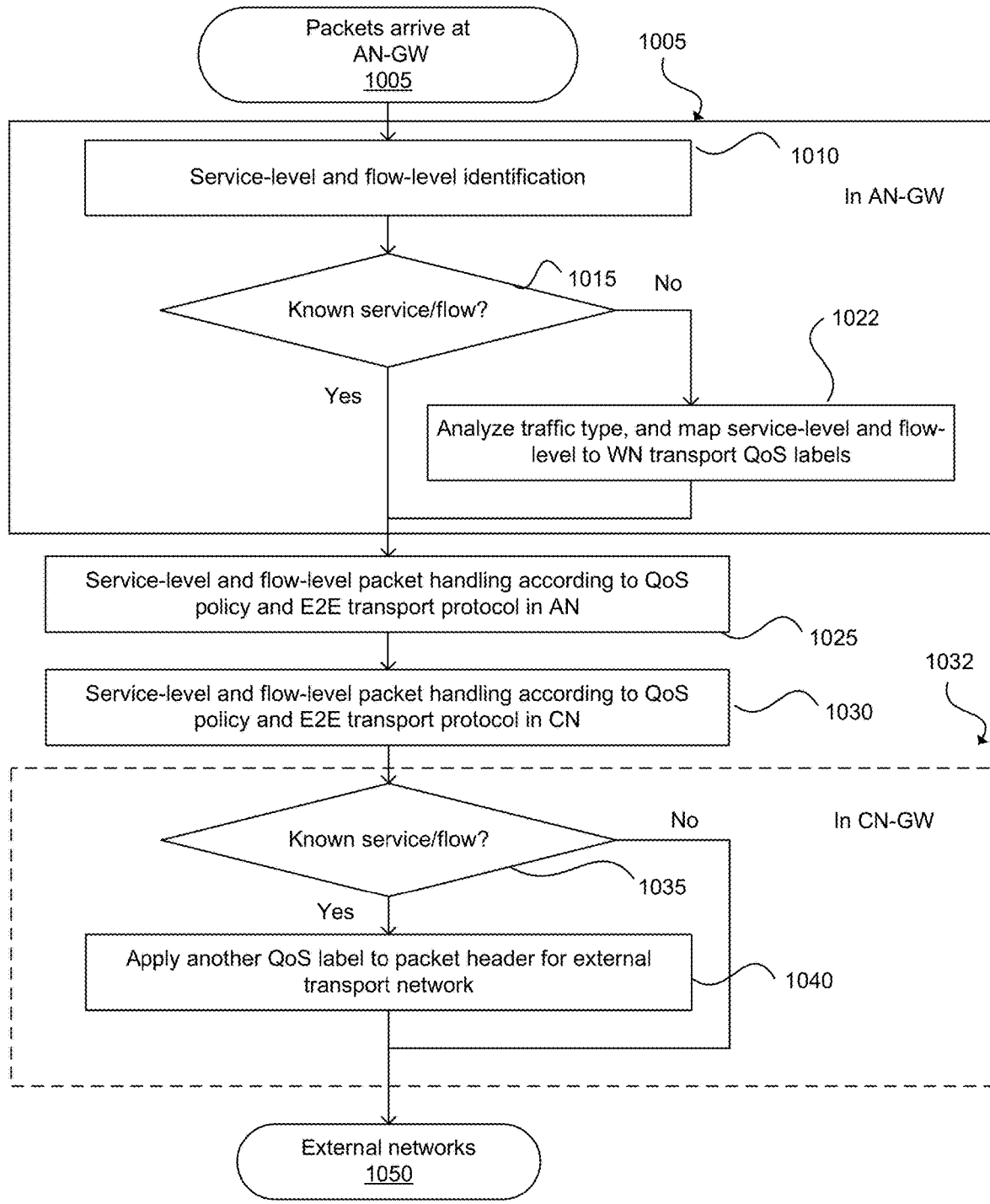
FIG. 12 is a process flow diagram illustrating an embodiment of handling uplink packets received from multiple radio nodes with different access technologies.

Referring to FIG. 12, a process flow diagram is presented to illustrate an embodiment of a procedure to handle uplink packets arriving at the AN-GW 210 from multiple radio nodes 215, 217 using a plurality of different RATs. In step 1005 packets arrive at the AN-GW 210. The AN-GW 210 is operative at 1008 to evaluate the packets and apply a QoS label if necessary. Steps 1010 to 1022 in section 1005 are performed by a CU in the RAN. In step 1010 the AN-GW 210 identifies a service-level and/or flow-level for each packet. In step 1015, the AN-GW 210 evaluates the identified service-level and/or flow-level to determine whether it is known or unknown. If unknown, in step 1022 the AN-GW 210 evaluates the packet header to identify a traffic type and to apply a wireless network transport QoS label to the packet header. The wireless network transport QoS label mapping to a known service-level and flow-level. In an aspect, the AN-GW 210 may perform rate control if there is only one AN-GW for this service/flow. In step 1025, if the identified service-level and flow-level is known, or after the QoS label has been set, the packets are scheduled in the AN according to the QoS policy and end-to-end transport, based upon the identified service-level and flow-level and/or QoS label mapping. Step 1025 is performed by routers in the AN. In step 1030, the packets are scheduled in the CN according to the QoS policy and end-to-end transport, based upon the identified service-level and flow-level and/or QoS label mapping. Step 1030 is performed by a UPF in the CN. In step 1032, the CN-GW 205 is operative to evaluate the received packets and optionally apply a QoS label. Steps 1035 to 1040 in section 1032 are performed by a UPF in the CN. In step 1035 the CN-GW 205 evaluates the identified service-level and/or flow-level to determine whether it is known or unknown. If the identified service-level and/or flow-level is known, the CN-GW 205 may evaluate the IP packet header and if the QoS bits have been modified, in step 1040 another QoS level may be set according to the external network requirements. For example, another QoS label may be applied to a packet header for an external transport network. An example of an external transport network is IPv6. In some aspects, the other QoS level may be the same as QoS level set by the UE 2 240. In step 1050 the packets may be forwarded to their destination in the external network(s).

Figure 13A:
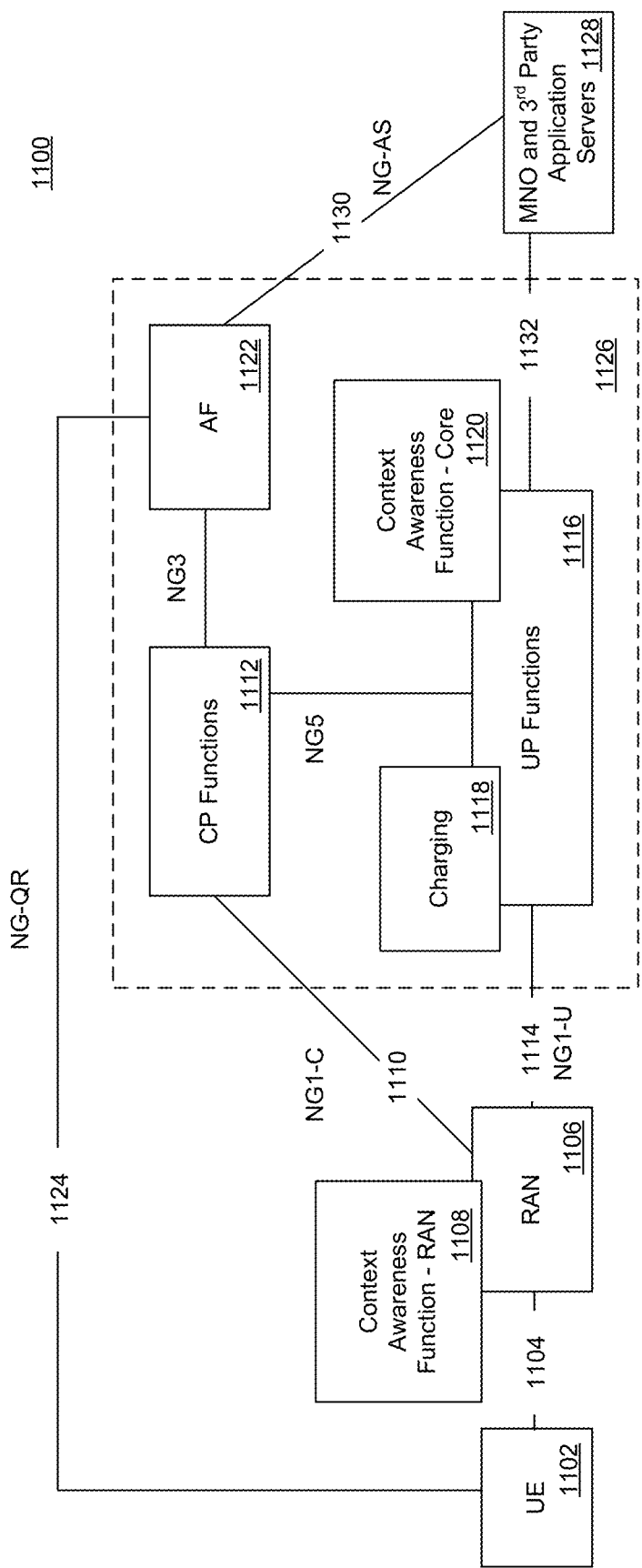
FIG. 13A is a block diagram an example of a secondary network architecture in which embodiments of the present invention may be practiced.

Referring to FIG. 13A, a block diagram is presented to illustrate an embodiment of a system arranged to enable QoS/QoE exchange with one or more application servers 135. FIG. 13A illustrates a secondary network architecture in which embodiments of the present invention may be practiced. The system of FIG. 13A can enable context-aware QoS reporting. A mobile device, such as UE 1102 connects to a radio access network 1106. In some embodiments, this is a next generation radio access network that includes a RAN specific context awareness function 1108. Traffic from UE 1102 is divided into control plane traffic that is transmitted over link NG1-C 1110 to Control Plane Functions 1112, and user plane traffic that is transmitted over link NG1-U 1114. User Plane traffic is transmitted to UP functions 1116. The traffic through the UP is subject to charging, and is monitored by charging function 1118 to enable billing and other charging related services. The functioning of the UP makes use of Core Network context awareness functions 1120. In the control plane, AF 1122 communicates with UE 1102 over link NG-QR 1124 for quality of service requirements. The control and user planes, along with their related functions make up the core network 1126, which in the context of the current discussion may be a next generation core network. Application Servers 1128 communicate with AF 1122 over a link such as the Next Generation Application server interface NG-AS 1130. Control information is exchanged over this link that allows for QoS and QoE information to be provided to the control plane, allowing for better management of the user plane traffic between the UE 1102 and the Application Server 1128, which is carried to the UP Functions 1116 over link 1132. It is understood that the AF 1122 in FIG. 13A refers to a network element, such as a NEF 144, a PCF 148, or another network element in the core network.

Figure 13B:
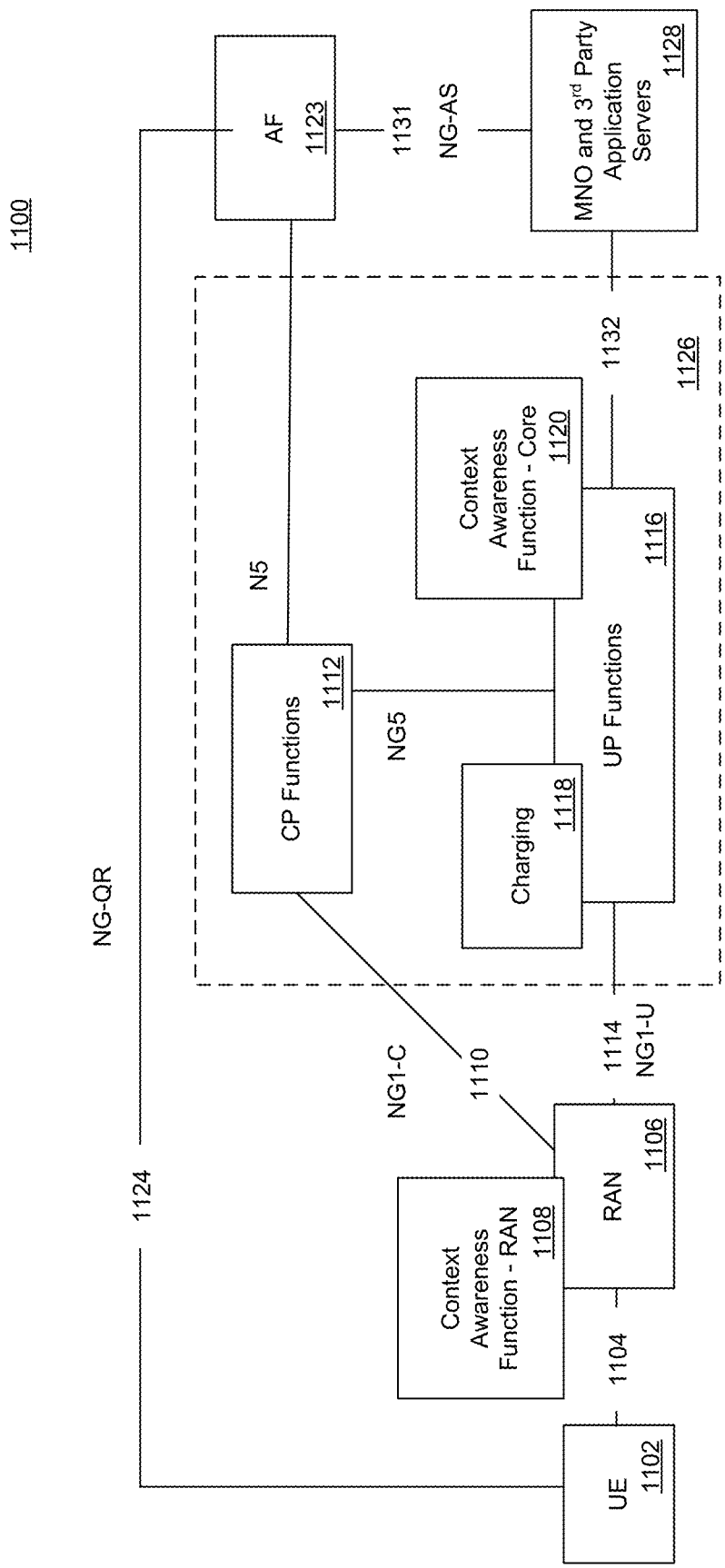
FIG. 13B is a block diagram an example of a secondary network architecture in which embodiments of the present invention may be practiced

FIG. 13B is a block diagram an example of a secondary network architecture in which embodiments of the present invention may be practiced. The AF 1123 is an external function that supports communications between the CP Function and the UE (through NG-QR/NG3 interface). The UE and Application Servers can send the CP Functions the required priority, QoS, QoE of flows or services.

The QoE reports are customized for different traffic types, including real-time and none-real-time video services. The QoE reports include information to identify flows and services (e.g., IP 5-tupple information, user subscriber number, TMSI), and application status (e.g., playout buffer size, service interruption time, and whether the application is background).

A Content requirement Awareness function in the Core (CAF-Core) 1120 supports a mechanism to identify the application sessions (e.g., a video download, a web page download, listening to music, posting to social media network, etc.) and to enforce QoS policies related with the detected applications. It receives QoS policies from the Core CP. Application detection is achieved by means of non-standardized algorithms (e.g., usage pattern, heuristics, SM detection for encrypted traffic as described as part of FS-SDCI Key Issue 3). CAF performs QoS enforcement in the CN based on QoS policies received from the Core CP.

The Content requirement Awareness Function (CAF-Core) 1120 is able to process QoS policies and is able to derive dynamic QoS targets and local enforcement actions in the CN. As long as it is within the limits of the QoS policies provided by the NextGen core CP function, it is able to update them in real-time based on the current content requirement of the user plane traffic mix, simultaneous competing flows and network status and resource availability. Thus, CAF-Core 1120 is bound to enforce QoS policies within the provided policy limits and there should be no deviation outside the range.

A Content requirement Awareness function in the RAN (CAF-RAN) 1108 supports a mechanism to identify the application sessions (e.g., a video download, a web page download, listening to music, posting to social media network, etc.) and to enforce QoS policies. It receives QoS policies from the Core CP. Content requirement Awareness function-RAN 1108 will use the application detection information provided by the core and it can infer additional specific requirements for the certain application session, shape the traffic for the given session at the same time. CAF-RAN 1108 performs QoS enforcement based on QoS policies received from the Core CP. This includes traffic shaping for DL and UL traffic. DL traffic shaping helps to control the flow of UL traffic.

The Content requirement Awareness Function (CAF-RAN) 1108 is able to process QoS policies and is able to derive dynamic QoS targets and local enforcement actions in the RAN. As long as it is within the limits of the QoS policies provided by the NextGen core, it is able to update them in real-time based on the current content requirement of the user plane traffic mix, simultaneous competing flows and network status and resource availability, and the application status information from the user's QoE report (e.g., the buffer status, size and playing duration of the coming segment, and playout status, whether the application is background, etc.). Thus, the CAF-RAN 1108 is bound to enforce QoS policies within the provided policy limits and there should be no deviation outside the range. This should ensure that the RAN is bound by the charging performed in the core thus there should be no impact to charging performed in the UP function within the core. Amount of specific traffic charged by the Core (in terms of bits) could be provided to RAN in terms of packet marking along with application marking so the CAF-RAN 1108 can enforce and preserve charged capacity.

It is understood that application detection typically requires the establishment and maintenance of the local state, which may have to be transferred between CAF-RANs 1108 to ensure successful application detection despite UE mobility.

Content requirement Awareness function-Core 1120 can perform the application detection and provide that information in the form of packet marking based on the policies received from the CN CP. The traffic shaping and policy enforcement in the CAF-RAN 1108 is bounded by the packet marking indicated by Content requirement Awareness function—Core 1120 and policies received from the CN CP that may refer to this marking. This should help ensure that the Content requirement Awareness Function—Core 1120 and Content requirement awareness function—RAN 1108 are working in coordinated manner, also ensure that the charging is performed for the application as indicated by the Content requirement Awareness Function—Core 1120.

QoS policies are stored at the CN CP functions 1112. At session establishment, subscriber and application specific policies are transferred to the Content requirement Awareness Function 1108 residing in the RAN and in the CN UP functions 1112. During the session, the UE can send QoE reports to the CN CP function 1112, which include information to identify flows/services (e.g., IP 5-tuple, subscriber identification number) and the application status (e.g., the buffer status, size and Playing duration of the coming segment, and playout status, whether the application is background, etc.). The CP functions 1112 can adjust the QoS policies for the application flows and then forwards the QoS policies to the UP function and AN for optimizing resource usage and policy enforcement.

The UP function 1116 in the core is responsible for traffic charging support (e.g., CDR, granted quota for on-line) based on the policies taking into account the outcome of Content requirement Awareness function 1108. It also marks the traffic sent downlink to the RAN.

The operator provisions subscriber and application specific QoS policies in the NextGen Core CP function. The CP function 1112 in the Core provides the policies to the RAN and CN UP function. The enforcement actions are derived by the enforcement points according to the current content requirement of the user plane traffic mix, simultaneous competing flows, and network status and resource availability.

Traffic charging support (e.g., CDR, granted quota for on-line) based on the policies taking into account the outcome of Content requirement Awareness function 1120 is performed in the CN UP function.

The following figures show the different set of QoS policies that may be provided to the UP functions and RAN:
  Intent level QoE and QoS policies which map a set of flow that may be identified by a (packet marking, SDF descriptor) into abstract QoE and QoS target e.g. Voice type QoS, Smoothed Bit rate QoS (limit the bandwidth variation for the traffic), bulk traffic (traffic may be discarded when the radio conditions are bad or the cell too loaded), etc.
  Transport QoS level policies which map a set of flow that may be identified by a (packet marking, SDF descriptor) into Explicit QoS targets (priority, delay, jitter, packet loss rate, etc.).

CP functions in the CAF-RAN 1108 and CAF-Core 1120 are responsible to locally map Intent level QoS policies into Transport QoS level policies based on local CAF policies and on local (radio) conditions (e.g., current context of the user plane traffic mix, simultaneous competing flows and network status and resource availability), bound by the upper limits of intent level QoS policies.

The following parameters are used for the QoS framework definition:
  Policy description:
    Scope of definition: application name or application type.
    Definition of Intent: QoE level, which is customized for specific services (e.g., "High Definition experience for RT multimedia") and with explicit QoS target level (e.g., maximum packet delay 150 ms for IMS video).
  Maximum Flow Bitrate: UL and DL bitrate value applicable for a single PDU session or aggregation of PDU sessions for a given UE. It indicates maximum bitrate authorized for the data session.
  Allocation and Retention Priority level (ARP): it refers to the priority level, the pre-emption capability and the pre-emption vulnerability for a given PDU session.
  Effective Flow Bit Rate: The bit rate the system should be dimensioned to provide a stable QoE range for single PDU flow.

It is noted that there can be multiple applications (e.g., video download, web browsing etc.) sessions within a single PDU session. QoS parameters (such as Policy Description, Maximum Flow Bit rate, Effective Flow Bit rate, and Allocation and Retention Priority level (ARP) are applicable the CN UP functions and the RAN.

The following reference points are assumed for the purpose of describing the QoS framework:
  NG1-C: Reference point between the RAN and CP functions.
  NG3: Reference point between the CP functions and an Application Function (AF).
  NG5: Reference point between the CP functions and UP functions.

NG1-U: Reference point between the RAN and UP functions.

NR-Uu: Reference point between the UE and the Next-Gen-RAN.

NG-QR: Reference point between UE and AF.

Figure 14A:
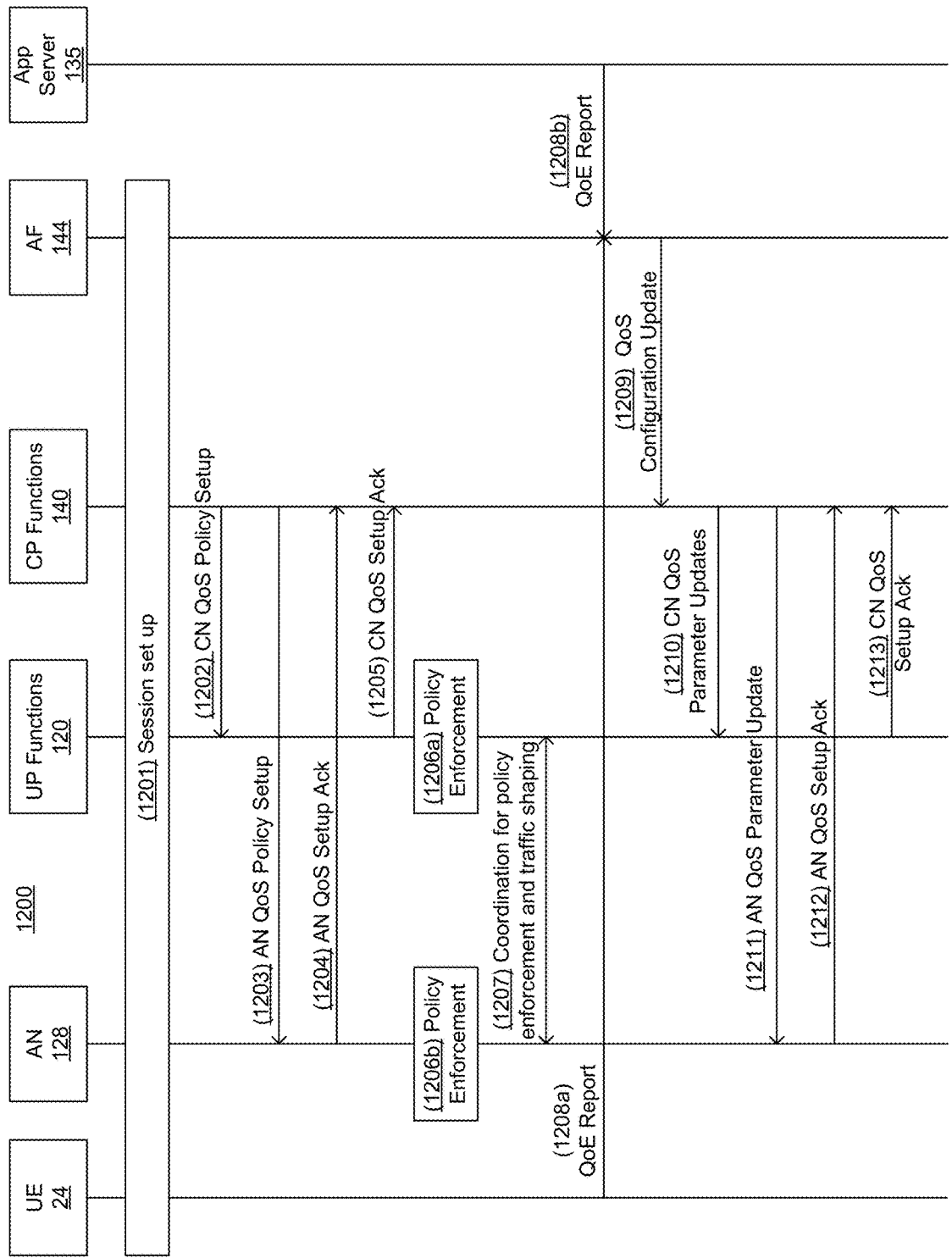
FIG. 14A illustrates, in a message flow diagram, an example of a method carried out by the nodes illustrated in FIG. 13A.

FIG. 14A is a signalling diagram illustrating a method (1200) carried out by the nodes illustrated in FIG. 13A. As illustrated, the diagram includes the following steps:

- (1201). A data session for the UE is setup. The setup process configures the manner in which user plane traffic between the UE the network nodes is managed. The data session carries all traffic related to user session regardless of the QoS characteristics of individual traffic flows. UE informs AF of the required QoE and QoS for specific flows and servers. This may be performed using link NG-QR 1124 UE informs AF which entity (either UE or Application Server)) will report real-time QoE feedback parameters. In some embodiments the RAN may, at the time of user plane session establishment, reject the request if sufficient radio resources are not available.
- (1202) and (1203). In response to the session setup, CP functions in the core network transmit subscriber-specific QoS parameters to UP Functions and optionally to the Access Network functions in the RAN. The UP functions and the AN functions can then establish a set of QoS rules (overall a QoS policy) in accordance with the QoS (and possibly QoE) parameters provided.
- (1204) and (1205). The UP functions and Access Network functions in the RAN acknowledge the subscriber-specific QoS policy configuration. In some embodiments, the AN functions in the RAN groups define QoS framework for the radio access portion of the connection.
- (1206*a*). The UP functions enforce the QoS policy and perform traffic shaping within CN as necessary.
- (1206*b*). The AN enforces the QoS policy and perform traffic shaping within RAN as necessary.
- (1207). AN and UP functions exchange policy and policy enforcement information. This allows for a coordination between AN and UP functions so that the services and flows are managed according to configured QoS parameters.
- (1208*a*) or (1208*b*). QoE reports are sent to AF (from at least one of the UE and the Application Server). These reports allow the AG to update the CP functions with performance data used to ensure that the QoE and QoS parameters can be kept updated. These reports provide data that can be used to generate QoS parameters for UP functions and AN. It is understood that the AF in FIG. 14A refers to a network element, such as a NEF 144, a PCF 148 or another network element in the core network.
- (1209). AF transmits QoS configuration updates to the CP functions. These updates may be representative of the data received in the report from the Application Server.
- (1210) and (1211). CP functions transmit QoS parameters to the UP and AN functions. These QoS parameters may differ from those provided in steps (1202) and (1203) if the parameters have to be adjusted to ensure that the QoS commitments are respected.
- (1212) and 1213). AN and UP functions acknowledge the new QoS parameter updates.

In some scenarios, it may be possible that either UP functions or AN cannot support new QoS parameter updates. CP functions could send QoS configuration update message to either UP functions or AN so that the network resources will not be over dimensioned.

In scenarios in which one of the UP and AN functions cannot support new QoS parameter updates, the UP or AN functions may inform the CP functions of the inability to properly update the parameters in the Ack message. In such a scenario, CP functions may send a QoS configuration update message to either the UP functions or the AN, to provide QoS feedback information. The recipient of the QoS feedback information, the UP functions or the AN, can adjust the QoE/QoS policy based upon the QoS feedback information to limit at least one allocated network resource. Limiting allocation of the at least one allocated network resource ensures that excess capacity is not allocated to an otherwise constrained communication channel.

In the previous embodiments, the AF is placed in the control plane. Alternative implementations can be possible. For example, the Application Function can be distributed in CN-GW, AN-GW, and radio nodes to avoid computational bottleneck or to provide independent QoE and QoS support policies for individual network segments. It is understood that the Application Function (AF) as described in this paragraph refers to a network function.

Figure 14B:
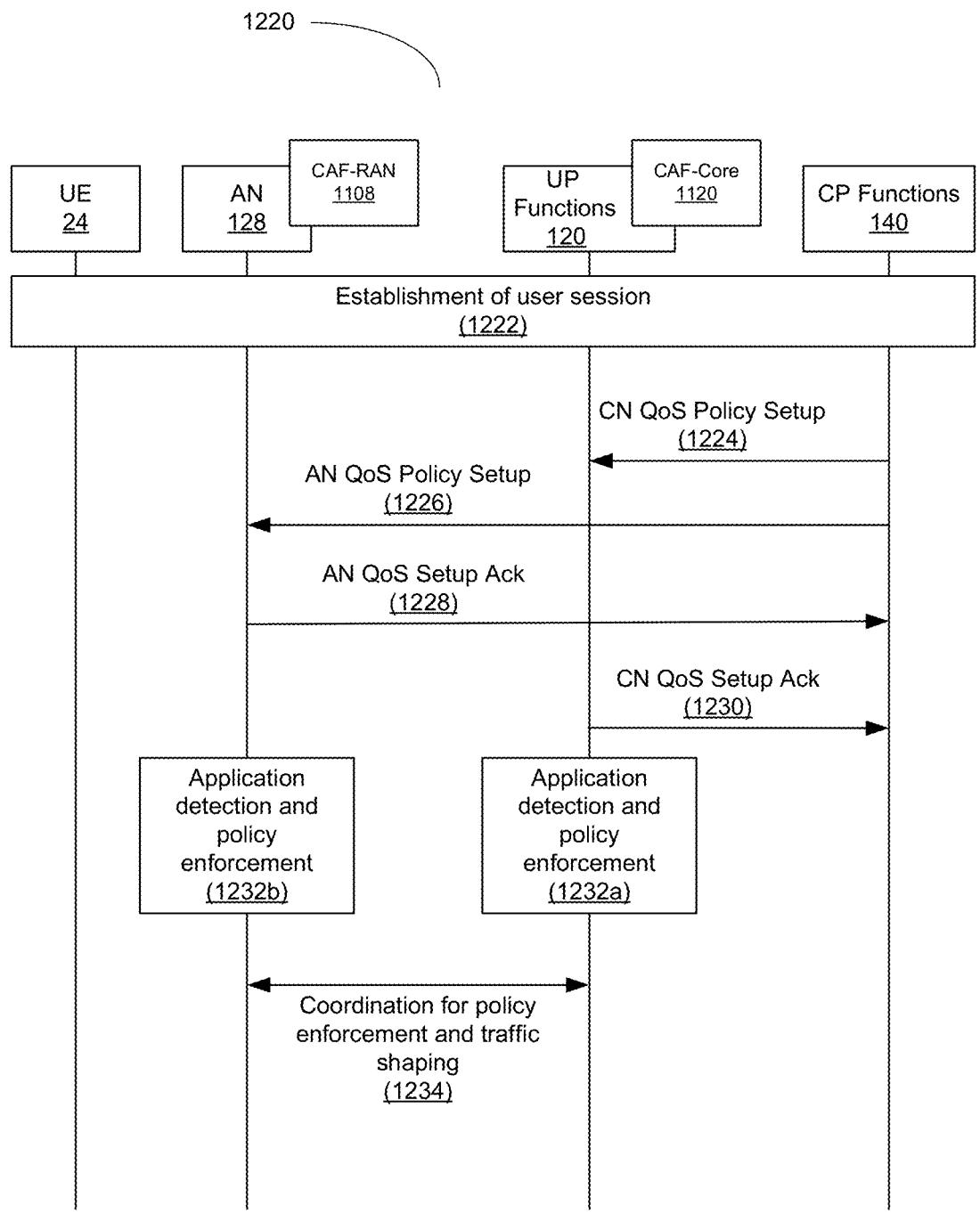
FIG. 14B is a message flow diagram illustrating interaction among network functions when a QoE reports is unavailable.

FIG. 14B is a message flow diagram illustrating interaction among network functions when a QoE report is unavailable (1220). At step (1222), a data session for user plane traffic is established between the UE 24 and a data network. The data session carries all traffic related to user session regardless of the QoS characteristics of individual traffic flow. It is noted that at the time of user plane session establishment, the RAN 128 has the possibility to reject the request, if sufficient radio resources are not available.

At steps (1224) and (1226), the CP functions in the core signals a subscriber specific QoS policy to the Content requirement Awareness Function 1120 within UP Functions 120 and to the RAN 128. For intent level policies, the Content requirement Awareness Function 1120 in the UP functions 120 and in the RAN 128 may be able to derive Transport (including RAN) QoS targets and ensure that the derived Transport QoS level policies are within the intent level.

At steps (1228) and (1230), the UP functions 120 and the RAN 128 acknowledge the subscriber specific QoS policy configuration.

At step (1232*a*), the Content requirement Awareness Function (CAF-Core) 1120 within the UP functions 120 in the CN detects the user's bi-directional application session, derives its service requirements and required transport resources. Taking into account the QoS policies received in step (1224), the Content requirement Awareness Function 1120 sets the transport QoS targets to be enforced by the UP functions 120. Transport QoS targets are autonomously self-calibrated and re-configured in real time based on monitoring of this user's and other users' applications sessions and on transport network resource status. It is noted that QoS policies include information about which traffic is prioritize. Different policies sent to the CAF functions are associated with priority rules. The relative priority between the flows is either explicitly provided by the CN CP function as part of Transport QoS level policies or it corresponds to a local mapping in the CAF-RAN 1108 from intent level QoS into transport QoS policies. The local mapping within CAF-RAN 1108 is dynamic but it is bound by the policies provided by the CN CP function.

At step (1232*b*), the Content requirement Awareness Function (CAF-RAN) 1108 within the RAN 128 determines the user's bi-directional application session and derives the service requirements and required radio resources and uplink transport resources. Taking into account the QoS policies received in step (1226), the Content requirement Awareness Function (CAF-RAN) 1108 configures the radio QoS targets to the radio scheduler and sets the transport QoS targets for uplink traffic. These radio QoS targets and uplink transport QoS targets are autonomously self-calibrated and reconfigured in real time based on monitoring of this user's and other users' applications sessions and on radio and transport network resource status. It is noted that this QoS framework may not require end-to-end bearers or tunneling in order to provide QoS differentiation.

At step (1234), in-band Coordination (i.e., using packet marking) occurs between the Content requirement Awareness Function 1120 in the Core and theh Content Requirement Awareness Function 1108 in the RAN to ensure consistent policy enforcement.

Figure 14C:
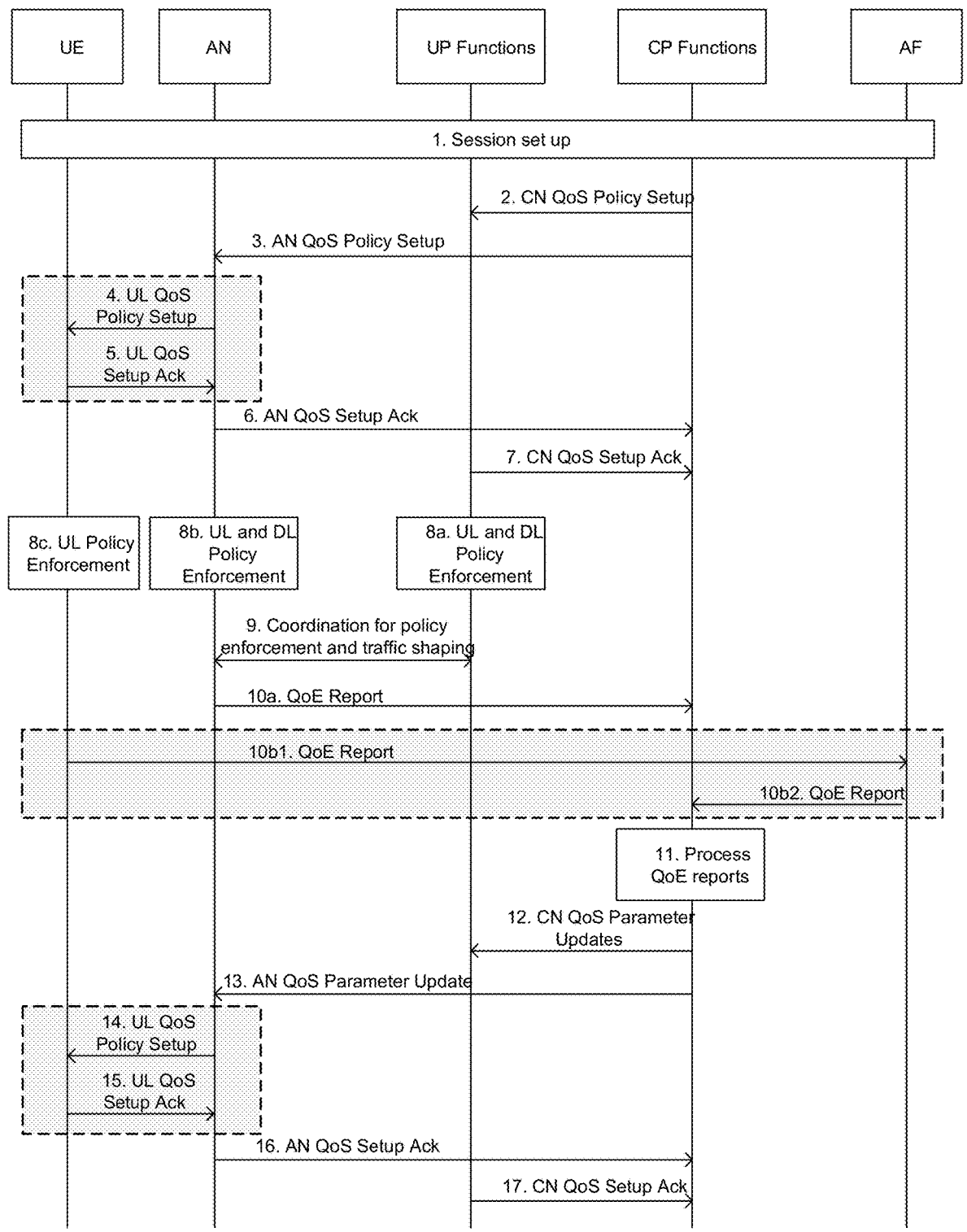
FIG. 14C is a message flow diagram illustrating interaction among network functions when a QoE reports is available.

FIG. 14C is a message flow diagram illustrating interaction among network functions when a QoE reports is available (1250).

At step (1252), a data session for user plane traffic is established between the UE 24 and a data network. The data session carries traffic related to user session regardless of the QoS characteristics of individual traffic flows. The UE sends a message to the CP functions providing codec capabilities, and required QoE and QoS for specific flows and servers. The UE 24 sends a message to the CP functions providing which entity (e.g., either UE 24 or Application Server 135) will report real-time QoE feedback parameters.

At step (1254), the CN CP functions 140 signals subscriber specific QoS parameters to the UP Functions 120 and to the AN 128 for uplink and downlink communications.

At step (1256), the CN CP functions 140 signals subscriber specific QoS parameters to the AN 128 for uplink and downlink communications.

Optionally, at step (1258), if the UL traffic is requested, the AN 128 signals the UE 24 the UL QoS parameters. Alternatively, the UL QoS parameters can be sent from CN CP functions 140.

Optionally, at step (1260), if the UL traffic is requested, the UE 24 acknowledges the UL QoS configuration.

At step (1262), the AN 128 acknowledges the subscriber specific QoS policy configuration, after admission control in AN 128 are acknowledged.

At step (1264), the UP functions 120 acknowledge the subscriber specific QoS policy configuration, after admission control in UP functions establishment are acknowledged.

At step (1266a), the UP functions 120 enforce the QoS policy and perform traffic shaping within CN.

At step (1266b), the AN 128 enforces the QoS policy and perform traffic shaping within RAN.

Optionally, at step (1266c), if UL traffic is present, the UE 24 applies QoS policy and performs traffic control in UL.

At step (1268), messages are sent between the AN 128 and the UP functions 120 to coordinate the delivery of services and flows according to configured QoS parameters.

At steps (1270a) or (1270b), QoE reports are sent to CP functions 140.

At steps (1272), CP functions 140 process QoE reports and adjust QoS parameters.

At steps (1274) and (1276), if QoS parameters of the flow are changed, the CP function 140 sends QoS update messages to the UP function 120 and the AN 128.

Optionally, at steps (1278) and (1280), 14 and 15, if UL traffic is present, the AN 128 informs the UE 24 of relevant QoS parameters.

At steps (1282) and (1284), the AN 128 and UP functions 120 acknowledge the new QoS parameter updates. The AN 128 may perform radio resource optimization to meet new QoS requirements.

A system for providing access to Quality of Service levels from within a network to entities outside of the network is provided. The network comprises a plurality of network nodes operative to provide a user plane, a control plane, and one or more user plane-control plane interfaces. The network also comprises at least one Quality of Service interface in the control plane in communication with the user plane. The at least one Quality of Service interface operative to monitor network resources in the user plane and to provide Quality of Service information to one or more entities outside of the network.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Figure 15:
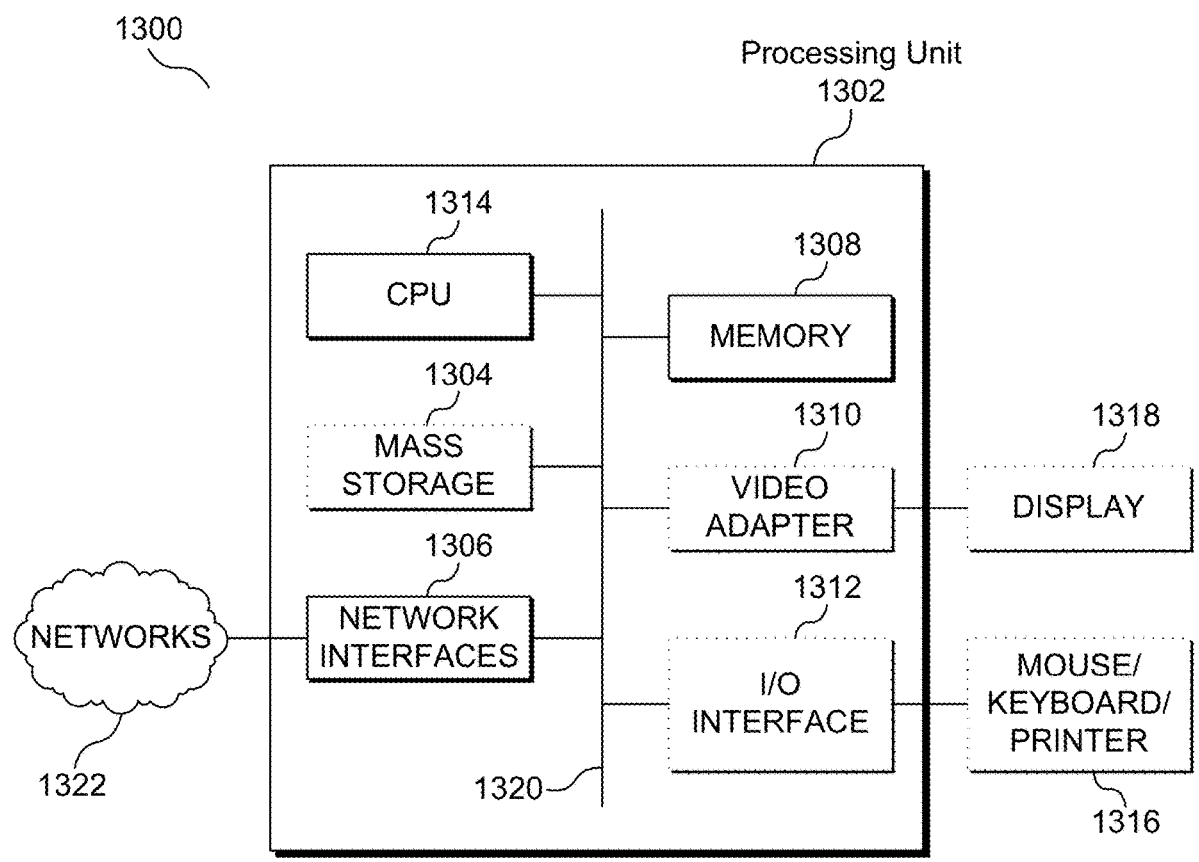
FIG. 15 illustrates, in a block diagram, a computing system that may be used for implementing some of the devices and methods disclosed herein.

FIG. 15 illustrates, in a block diagram, a computing system 1300 that may be used for implementing some of the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1300 includes a processing unit 1302. The processing unit 1302 includes a central processing unit (CPU) 1314, memory 1308, and may further include a mass storage device 1304, a video adapter 1310, and an I/O interface 1312 connected to a bus 1320.

The bus 1320 may be one or more of any type of several bus architectures including a memory bus or memory controller, a peripheral bus, or a video bus. The CPU 1314 may comprise any type of electronic data processor. The memory 1308 may comprise any type of non-transitory system memory such as static random access memory (SRAM), dynamic random access memory (DRAM), synchronous DRAM (SDRAM), read-only memory (ROM), or a combination thereof. The memory 1308 may include ROM for use at boot-up, and DRAM for program and data storage for use while executing programs.

The mass storage 1304 may comprise any type of non-transitory storage device configured to store data, programs, and other information and to make the data, programs, and other information accessible via the bus 1320. The mass storage 1304 may comprise, for example, one or more of a solid state drive, hard disk drive, a magnetic disk drive, or an optical disk drive.

The video adapter 1310 and the I/O interface 1312 provide interfaces to couple external input and output devices to the processing unit 1302. As illustrated, examples of input and output devices include a display 1318 coupled to the video adapter 1310 and a mouse/keyboard/printer 1316 coupled to the I/O interface 1312. Other devices may be coupled to the processing unit 1302, and additional or fewer interface cards may be utilized. For example, a serial interface such as universal serial bus (USB) (not shown) may be used to provide an interface for an external device.

The processing unit 1302 may also include one or more network interfaces 1306, which may comprise wired links, such as an Ethernet cable, and/or wireless links to access nodes or different networks. The network interfaces 1306 allow the processing unit 1302 to communicate with remote units via the networks. For example, the network interfaces 1306 may provide wireless communication via one or more transmitters/transmit antennas and one or more receivers/receive antennas. The processing unit 1302 may be coupled to a local-area network 1322 or a wide-area network for data processing and communications with remote devices, such as other processing units, the Internet, or remote storage facilities.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for managing an ongoing data flow based on a quality of service (QoS) policy, the method comprising:
monitoring, by a radio access network (RAN) node, an ongoing condition of radio resources of the RAN node for the on-going data flow;
responsive to the monitoring, on condition that there is a change of the ongoing condition, determining, by the RAN node, whether a QoS parameter can be supported, the QoS parameter being associated with an effective flow bit rate for the ongoing data flow;
on condition that the effective flow bit rate cannot be supported, informing, by the RAN node, a control plane of an inability to guarantee the effective flow bit rate;
wherein the control plane including a network exposure interface function including interfaces for exchanging information with an external application server (AS), the method further comprising:
determining, by the network exposure interface function, network capability information upon receiving a change notification of the change in the QoS parameter; and
sending, by the network exposure interface function, the network capability information based on the received change notification to the AS;
upon receiving the network capability information, the AS selecting a transport protocol and protocol parameters for the on-going data flow of at least one network service based on the received network capability information.

2. The method as claimed in claim 1, wherein the network capability information comprises at least one of:
an assigned quality of service (QoS) parameter associated with a data flow between where the application server is located and a user equipment (UE);
a UE mobility context of the UE; and
a QoS label for a data flow of the network service; and wherein:
the QoS label comprises a priority level label attachable to packets of data flows between the application server and the UE; and
the network exposure interface function further exposes, for the on-going data flow, at least one of:
a mean data rate;
a minimum data rate;
a maximum data rate;
an effective data rate;

a packet delay limit; and a packet loss rate.

3. The method as claimed in claim 1, the control plane including the network exposure interface function and a policy control function (PCF), the method further comprising:

sending, by the AS to the control plane via the network exposure interface function, the selected transport protocol and protocol parameter; determining, by the control plane, how to handle the data flow based on the selected transport protocol and protocol parameters.

4. A communication system comprising:

a radio access network (RAN) node and a control plane, wherein the RAN node comprises at least one processor operatively coupled to a corresponding set of memory components which include stored program instructions for execution by the at least one processor such that the RAN node is configured to:

monitor an ongoing condition of radio resources of the RAN node for an on-going data flow, in response to the monitoring, determine, on condition that there is a change of the ongoing condition, whether a QoS parameter can be supported, the QoS parameter being associated with an effective flow bit rate for the ongoing data flow; and on condition that the QoS parameter cannot be supported, inform the control plane, via a first network interface enabling communications between the RAN node and the control plane, of an inability to guarantee the new QoS parameter;

the control plane comprises at least one processor operatively coupled to a corresponding set of memory components which include stored program instructions for execution by the at least one processor such that the control plane is configured to:

obtain information being informed by the RAN node;

and expose such information to an application server;

the control plane including a network exposure interface function including interfaces for exchanging information with an external application server (AS), the network exposure interface function configured for:

determining, by the network exposure interface function, network capability information upon receiving a change notification of the change in the QoS parameter; and sending, by the network exposure interface function, the network capability information based on the received change notification to the AS;

and the AS configured for: upon receiving the network capability information, the AS selecting a transport protocol and protocol parameters for the on-going data flow of at least one network service based on the received network capability information.

5. The method of claim 1 further comprising, prior to the monitoring, receiving, by the RAN node, an effective flow bit rate of a data flow from a control plan function for the RAN node to monitor.

6. The method of claim 1 wherein the on-going data flow is between an application server and a user equipment (UE).

7. The communication system as claimed in claim 4, the control plane including at least one processor operatively coupled to a corresponding set of memory components which include stored program instructions for execution by the at least one processor to implement a network exposure interface function, wherein the network exposure interface function is configured to determine network capability information upon receiving a change notification of the change in the network condition, and send the network capability information based on the received change notification to an application server via a fourth network interface enabling communications between the network exposure interface function and the application server.

8. The communication system as claimed in claim 7, wherein the application server comprises at least one processor operatively coupled to a corresponding set of memory components which include stored program instructions for execution by the at least one processor, the application server being for configuring the application server to:

receive the network capability information; and select a transport protocol and protocol parameters for a data flow of at least one network service based on the received network capability information.

9. The communication system as claimed in claim 8, wherein the control plane including at least one processor operatively coupled to a corresponding set of memory components which include stored program instructions for execution by the at least one processor to implement a network exposure interface function the application server is further configured to send the selected transport protocol and protocol parameter to the control plane via the network exposure interface function; and the control plane being further configured to determine how to handle the data flow based on the selected transport protocol and protocol parameters.

10. The communication system of claim 4 wherein the on-going data flow is between where an application server is located and a user equipment (UE).

11. The method of claim 1 further comprising:

receiving, by the control plane, information informed by the RAN node; and sending, by the control plane, the information to another function.

12. The method of claim 11, wherein the another function is an application server (AS), the method further comprising:

receiving, by the control plane, from the AS server, updated transport protocol parameters for the on-going data flow; and updating, by the RAN node, the on-going data flow based on the updated transport protocol parameters.

13. The communication system as claimed in claim 7, wherein the network capabilities information comprises at least one of:

at least one assigned quality of service (QoS) parameter for at least one data flow of at least one network service between where the application server is located and a user equipment (UE);

a UE mobility context of the UE; and at least one QoS label for individual data flows of the at least one data flow of the at least one network service.

14. The communication system as claimed in claim 13, wherein:

the QoS label comprises a priority level label attachable to packets of data flows between the application server and the UE; and the network exposure interface function further exposes, for the on-going data flow, at least one of:

a mean data rate;

a minimum data rate;

a maximum data rate;
an effective data rate;
a packet delay limit; and
a packet loss rate.

\* \* \* \* \*